United States Patent
Ko et al.

(10) Patent No.: US 10,075,276 B2
(45) Date of Patent: Sep. 11, 2018

(54) CARRIER AGGREGATION IN WIRELESS COMMUNICATION SYSTEMS

(71) Applicant: Electronics and Telecommunications Research Institute, Daejeon (KR)

(72) Inventors: Young Jo Ko, Daejeon (KR); Tae Gyun Noh, Daejeon (KR); Kyoung Seok Lee, Daejeon (KR); Bang Won Seo, Daejeon (KR); Byung Jang Jeong, Daejeon (KR); Heesoo Lee, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 38 days.

(21) Appl. No.: 14/598,518

(22) Filed: Jan. 16, 2015

(65) Prior Publication Data
US 2015/0124771 A1    May 7, 2015

Related U.S. Application Data

(60) Division of application No. 14/060,319, filed on Oct. 22, 2013, now Pat. No. 8,971,168, which is a
(Continued)

(30) Foreign Application Priority Data

Jan. 11, 2010 (KR) .................. 10-2010-0002231
Feb. 1, 2010 (KR) .................. 10-2010-0009024
(Continued)

(51) Int. Cl.
*H04L 5/00* (2006.01)
*H04L 1/00* (2006.01)
(Continued)

(52) U.S. Cl.
CPC .......... *H04L 5/0055* (2013.01); *H04L 1/0027* (2013.01); *H04L 1/1614* (2013.01);
(Continued)

(58) Field of Classification Search
CPC ... H04L 1/0027; H04L 1/1614; H04L 1/1671; H04L 1/1854; H04L 1/1893; H04L 5/001;
(Continued)

(56) References Cited

U.S. PATENT DOCUMENTS 8,837,450 B2 *   9/2014   Papasakellariou .... H04L 1/1861
                                                         370/342
2004/0066738 A1   4/2004   Stopler
(Continued)

FOREIGN PATENT DOCUMENTS

JP     2003-510883    3/2003
JP     2003-110532    4/2003
(Continued)

OTHER PUBLICATIONS

R1-080316; "Multi-ACK transmission in PUCCH for TDD"; 3GPP TSG RAN WG1 Meeting #51bis; Seville, Spain,Jan. 14-18, 2008; Nokia.*
(Continued)

*Primary Examiner* — Benjamin H Elliott, IV

(57) ABSTRACT

Provided is a data transmission system using a carrier aggregation. The data transmission system may assign a radio resource based on a correspondence relationship between a downlink and an uplink, and may transmit data using the assigned radio resource.

37 Claims, 13 Drawing Sheets

Related U.S. Application Data continuation of application No. 13/733,453, filed on Jan. 3, 2013, now Pat. No. 8,593,936, which is a continuation of application No. 13/441,058, filed on Apr. 6, 2012, now Pat. No. 8,363,537, which is a continuation of application No. PCT/KR2011/000195, filed on Jan. 11, 2011.

(30) Foreign Application Priority Data

| Feb. 12, 2010 | (KR) | 10-2010-0013352 |
|---|---|---|
| Apr. 2, 2010 | (KR) | 10-2010-0030515 |
| Apr. 9, 2010 | (KR) | 10-2010-0032647 |
| Aug. 9, 2010 | (KR) | 10-2010-0076337 |
| Aug. 18, 2010 | (KR) | 10-2010-0079742 |
| Aug. 27, 2010 | (KR) | 10-2010-0083363 |
| Sep. 1, 2010 | (KR) | 10-2010-0085528 |
| Sep. 2, 2010 | (KR) | 10-2010-0085888 |
| Nov. 8, 2010 | (KR) | 10-2010-0110258 |
| Nov. 9, 2010 | (KR) | 10-2010-0111130 |
| Nov. 12, 2010 | (KR) | 10-2010-0112531 |
| Jan. 11, 2011 | (KR) | 10-2011-0002855 |

(51) Int. Cl.
| | |
|---|---|
| H04L 1/16 | (2006.01) |
| H04L 1/18 | (2006.01) |
| H04W 72/04 | (2009.01) |
| H04W 72/12 | (2009.01) |

(52) U.S. Cl.
CPC .......... *H04L 1/1671* (2013.01); *H04L 1/1854* (2013.01); *H04L 1/1893* (2013.01); *H04L 5/001* (2013.01); *H04L 5/0001* (2013.01); *H04L 5/0048* (2013.01); *H04L 5/0094* (2013.01); *H04W 72/0406* (2013.01); *H04L 1/0073* (2013.01); *H04L 5/0023* (2013.01); *H04L 5/0082* (2013.01); *H04W 72/1289* (2013.01)

(58) Field of Classification Search
CPC ... H04L 5/0048; H04L 5/0055; H04L 5/0094; H04L 5/0001; H04L 5/0082; H04L 5/0023; H04L 1/0073; H04W 72/0406; H04W 72/1289; H04W 72/00; H04W 48/16

See application file for complete search history.

(56) References Cited

U.S. PATENT DOCUMENTS

| 2008/0165893 | A1 | 7/2008 | Malladi et al. | |
|---|---|---|---|---|
| 2008/0298488 | A1 | 12/2008 | Shen et al. | |
| 2008/0305788 | A1 | 12/2008 | Malladi et al. | |
| 2009/0046646 | A1 | 2/2009 | Cho et al. | |
| 2009/0186625 | A1 | 7/2009 | Qu et al. | |
| 2009/0279493 | A1 | 11/2009 | Gaal et al. | |
| 2010/0135359 | A1 | 6/2010 | Nakao et al. | |
| 2010/0172235 | A1 | 7/2010 | Liu et al. | |
| 2010/0316146 | A1 | 12/2010 | McBeath et al. | |
| 2010/0329200 | A1* | 12/2010 | Chen | H04L 5/00 370/329 |
| 2011/0141928 | A1* | 6/2011 | Shin | H04L 1/0028 370/252 |
| 2011/0243066 | A1* | 10/2011 | Nayeb Nazar | H04L 1/007 370/328 |
| 2012/0087254 | A1* | 4/2012 | Yin | H04L 1/0031 370/252 |
| 2012/0140716 | A1 | 6/2012 | Baldemair et al. | |
| 2013/0058302 | A1 | 3/2013 | Kim et al. | |
| 2013/0129013 | A1 | 5/2013 | Han et al. | |
| 2015/0124771 | A1* | 5/2015 | Ko | H04L 1/0027 370/329 |

FOREIGN PATENT DOCUMENTS

| JP | 2013-516937 A | 5/2013 | |
|---|---|---|---|
| KR | 1020090015813 | 2/2009 | |
| KR | 2009-0099500 A | 9/2009 | |
| WO | 2008/106317 A1 | 9/2008 | |
| WO | 2009/020376 A2 | 2/2009 | |
| WO | 2009/057285 A1 | 5/2009 | |
| WO | WO 2010123303 A2 * | 10/2010 | H04L 1/1854 |
| WO | 11/084038 A2 | 7/2011 | |

OTHER PUBLICATIONS

ETSI TS 136 211 V8.5.0; "LTE; Evolved Universal Terrestrial Radio Access (E-UTRA); Physical channels and modulation (3GPP TS 36.211 version 8.5.0 Release 8)"; Feb. 2009.*

Catt, "UL ACK/NACK Transmission Design in FDD with CA", R1-100876, 3GPP TSG RAN WG1 Meeting #60, Feb. 22-26, 2010, San Francisco, USA.

Ericsson et al, "Power control for PUCCH format 3", R1-105317, 3GPP TSG RAN WG1 Meeting #62bis, Oct. 11-15, 2010, Xi'an, China.

Ericsson et al, "Power control for Channel selection", R1-106328, 3GPP TSG RAN WG1 Meeting #63, Nov. 15-19, 2010, Jacksonville, USA.

Alcatel-Lucent et al, "Remaining Issues for A/N transmission on PUCCH for TDD", R1-105983, 3GPP TSG RAN WG1 #63, Nov. 15-19, 2010, Jacksonville, USA.

Huawei et al, "Coding and resource mapping for UCI on PUSCH", R1-106446, 3GPP TSG RAN WG1 Meeting #63, Nov. 15-19, 2010, Jacksonville, USA.

Extended European Search Report for European Application No. 16152110.9 dated Jun. 6, 2016.

3GPP TSG-RAN Metting #53, "Draft Change Request," R1-082219, 5 pages, (2008).

Ericsson et al., "PUCCH Design for CA," 3GPP TSG RAN WG1 Meeting #61bis, R1-103506, 5 pages, (2010).

ETRI, "Details of DFT-S-OFDM based A/N transmission," 3GPP TSG RAN WG1 Meeting #62, R1-104665, 3 pages, (2010).

ETSI TS 136 211 V8.7.0, "LTE; Evolved Universal Terrestrial Radio Access (E-UTRA); Physical channels and modulation (3GPP TS 36.211 version 8.7.0 Release 8)," http://www.etsi.org, 87 pages (2009).

LG Electronics Inc., "Consideration on Punctured PUCCH Format," 3GPP TSG RAN WG1 #52bis, R1-081259, 4 pages (2008).

LG Electronics, "Issues on DL ACK/NACK in Carrier Aggregation," 3GPP TSG RAN WG1 Meeting #58bis, R1-094160, pp. 1-3 (2009).

LG Electronics, "Uplink ACK/NACK transmission in LTE-Advanced," 3GPP TSG RAN WG1 #58bis, R1-094163, pp. 1-6 (2009).

Nokia Siemens Networks et al., "Details for Block Spread DFT-S-OFDMA," 3GPP TSG RAN WG1 Meeting #62, R1-104429, 5 pages, (2010).

Nokia Siemens Networks et al., "Scrambling Sequence Initialisation," 3GPP TSG-RAN Working Group 1 #52, Tdoc R1-080940, 4 pages, (2008).

Panasonic, "Signaling parameters for UL ACK/NACK resources," 3GPP TSG RAN WG1 Meeting #50, R1-073616, 3 pages, (2007).

Samsung, "Slot-level UL ACK/NACK Cyclic Shift/Orthogonal Cover Remapping," 3GPP TSG RAN WG1 Meeting #52, R1-080680, 6 pages (2008).

ZTE, "System Information Acquisition and updating for Carrier Aggregation," 3GPP TSG RAN WG2 #67, R2-094710, pp. 1-2 (2009).

International Search Report and Written Opinion for Application No. PCT/KR2011/000195, pp. 1-9, dated Sep. 28, 2011.

(56) References Cited

OTHER PUBLICATIONS

Panasonic, "Signaling parameters for UL ACK/NACK resources", R1-073616, 3GPP TSG RAN WG1 Meeting #50, pp. 1-3, Aug. 20-24, 2007, Athens, Greece.
ZTE, "ACK/NACK Design for LTE-Advanced", R1-093821, TSG-RAN WG1 #58bis, pp. 1-9, Oct. 12-16, 2009, Miyazaki, Japan.
3GPP, "3rd Generation Partnership Project; Technical Specification Group Radio Access Network; Evolved Universal Terrestrial Radio Access (E-UTRA); Physical layer procedures (Release 9)", 3GPP TS 36.213 V9.0.1 (Dec. 2009), pp. 69-75.
3GPP, "3rd Generation Partnership Project; Technical Specification Group Radio Access Network; Evolved Universal Terrestrial Radio Access (E-UTRA); Multiplexing and channel coding (Release 9)", 3GPP TS 36.212 V9.0.0 (Dec. 2009), pp. 34-38.
SMG2, "Evaluation Document SMG2-Beta Concept", Tdoc SMG 896/97, ETSI SMG#24, Dec. 15-19, 1997, Madrid, Spain.
ETRI, "A/N codebook adaptation for CA", R1-104666, 3GPP TSG RAN WG1 Meeting #62, Aug. 23-27, 2010, Madrid, Spain.
Huawei, "Analysis and evaluation of extended channel selection", R1-103361, 3GPP TSG RAN WG1 Meeting #61, May 10-14, 2010, Montreal, Canada.
ETRI, "Channel Selection Methods for ACK/NACK Transmission in CA", R1-103194, 3GPP TSG RAN WG1 Meeting #61, Montreal, Canada.

\* cited by examiner (A) NORMAL CP (B) EXTENDED CP (A) NORMAL CP (B) EXTENDED CP (A) NORMAL CP (B) EXTENDED CP

CARRIER AGGREGATION IN WIRELESS COMMUNICATION SYSTEMS

This application is a Divisional of U.S. continuation patent application Ser. No. 14/060,319 filed on Oct. 22, 2013, which claims priority to, and the benefit of, U.S. continuation patent application Ser. No. 13/733,453 filed on Jan. 3, 2013, now U.S. Pat. No. 8,593,936 granted on Nov. 26, 2013, U.S. patent application Ser. No. 13/441,058 filed on Apr. 6, 2012 now U.S. Pat. No. 8,363,537 granted on Jan. 29, 2013, which is a continuation application of PCT Application No. PCT/KR2011/000195 filed on Jan. 11, 2011, and Korean Patent Application No. 10-2010-0002231 filed on Jan. 11, 2010, Korean Patent Application No. 10-2010-0009024 filed on Feb. 1, 2010, Korean Patent Application No. 10-2010-0013352 filed on Feb. 12, 2010, Korean Patent Application No. 10-2010-0030515 filed on Apr. 2, 2010, Korean Patent Application No. 10-2010-0032647 filed on Apr. 9, 2010, Korean Patent Application No. 10-2010-0076337 filed on Aug. 9, 2010, Korean Patent Application No. 10-2010-0079742 filed on Aug. 18, 2010, Korean Patent Application No. 10-2010-0083363 filed on Aug. 27, 2010, Korean Patent Application No. 10-2010-0085528 filed on Sep. 1, 2010, Korean Patent Application No. 10-2010-0085888 filed on Sep. 2, 2010, Korean Patent Application No. 10-2010-0110258 filed on Nov. 8, 2010, Korean Patent Application No. 10-2010-0111130 filed on Nov. 9, 2010, Korean Patent Application No. 10-2010-0112531 filed on Nov. 12, 2010, and Korean Patent Application No. 10-2011-0002855 filed on Jan. 11, 2011, in the Korean Intellectual Property Office. The content of the aforementioned applications is incorporated herein by reference.

TECHNICAL FIELD

The present invention relates to a wireless communication system, and more specifically, to a wireless communication system employing carrier aggregation (CA).

BACKGROUND ART

A carrier aggregation (CA) scheme corresponds to technology of enhancing the efficiency of data transmission by merging a plurality of component carriers. A terminal or a base station may be assigned with the plurality of component carriers and may transmit or receive data using the plurality of component carriers.

The terminal or the base station may transmit control information associated with the data. Acknowledgement/negative-acknowledgement information (ACK/NACK) and an amount of assigned radio resources may be used as an example of the control information. There is a desire for research regarding a component carrier used to transmit control information among a plurality of component carriers and the control information to be transmitted when the plurality of component carriers is assigned.

Disclosure of Invention Technical Goals

An aspect of the present invention provides a method of transmitting control information when a component carrier scheme is applied.

Technical Solutions

According to an aspect of the present invention, there is provided a terminal including: a receiver to receive control information and data using a plurality of downlink component carriers; a controller to determine an uplink channel element included in an uplink component carrier, based on an index of a channel element used to transmit the control information among a plurality of downlink channel elements included in the plurality of downlink component carriers; and a transmitter to transmit acknowledgement/negative-acknowledgement information (ACK/NACK) associated with the data using the determined uplink channel element.

According to another aspect of the present invention, there is provided a terminal including: a receiver to receive data from a base station; a controller to generate ACK/NACK associated with the data; and a transmitter to transmit, to the base station, a data packet including the ACK/NACK and a scheduling request with respect to the base station. The transmitter may determine a transmit power of the data packet based on a number of bits of the ACK/NACK and a number of bits of the scheduling request that are included in the data packet.

According to still another aspect of the present invention, there is provided a terminal including: a receiver to receive, from a base station, information associated with downlink component carriers available for a communication between the base station and the terminal, and to receive a data block using a portion of or all of data receiving component carriers among the downlink component carriers; and an ACK/NACK generator to generate ACK/NACK associated with the data block with respect to each of the downlink component carriers, based on a transmission mode of each of the downlink component carriers.

According to yet another aspect of the present invention, there is provided a terminal including a transmitter to transmit, to a base station, a subframe including a first slot and a second slot. A first cyclic shift included in the first slot and a second cyclic shift included in the second slot may be different from each other.

Effect of the Invention

According to embodiments of the present invention, it is possible to transmit control information when a component carrier scheme is applied.

BEST MODE FOR CARRYING OUT THE INVENTION

Figure 1:
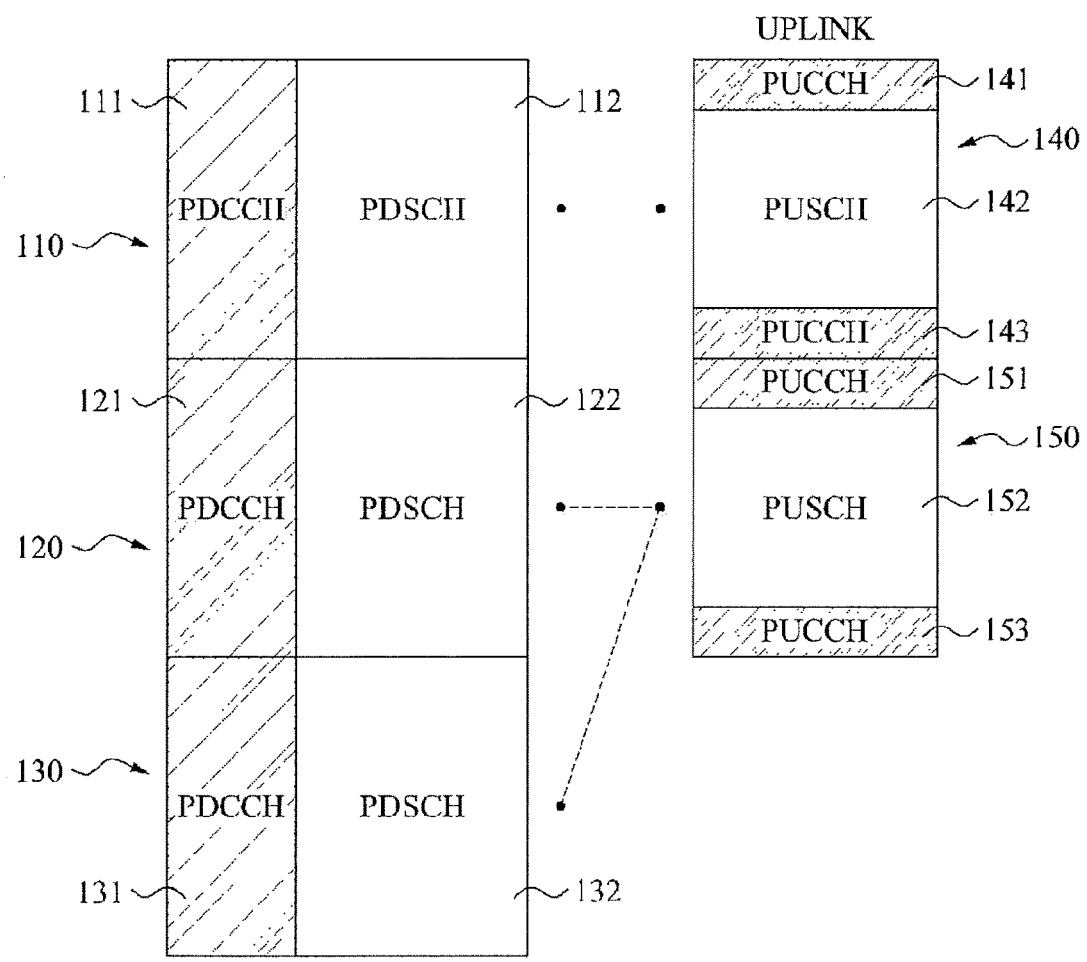
FIG. 1 is a diagram illustrating correspondence relationship between a downlink component carrier and an uplink component carrier.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating correspondence relationship between a downlink component carrier (CC) and an uplink CC.

A terminal may receive data from a base station using a plurality of downlink CCs 110, 120, and 130, and may transmit, to the base station, an acknowledgement (ACK)/negative-acknowledgement (NACK) message with respect to the data using a plurality uplink CCs 140 and 150.

Each of the downlink CCs 110, 120, and 130 may include control information, for example, Physical Downlink Control Channels (PDCCHs) 111, 121, and 131, and data, for example, Physical Downlink Shared Channels (PDSCHs) 112, 122, and 132. Each of the uplink CCs 140 and 150 may include control information, for example, Physical Uplink Control Channels (PUCCHs) 141, 143, 151, and 153, and data, for example, Physical Uplink Shared Channels (PUSCHs) 142 and 152.

The terminal may set, as the downlink primary component carrier (PCC), one of CCs included in a set of configured CCs. Remaining CCs excluding the downlink PCC from the configured CCs may be referred to as downlink secondary component carriers (SCCs).

The downlink PCC may be included in the set of configured CCs of the terminal at all times while the terminal maintains an access with the base station. The downlink PCC may correspond to a CC used at the base station to transmit system information. The base station may transmit system information associated with the PCC and system information associated with the SCC using the PCC.

The base station may notify the terminal of the downlink PCC using Radio Resource Control (RRC) signaling.

An uplink CC used at the terminal to transmit PUCCH acknowledgement/negative-acknowledgement information (ACK/NACK) may be referred to as the uplink PCC. The downlink PCC and the uplink PCC may need to be connected to each other by a predetermined connection relationship. The base station may notify the terminal of the uplink PCC using RRC signaling.

The uplink PCC and the downlink PCC may be differently set for each terminal.

Using RRC signaling, the base station may notify the terminal regarding whether cross-carrier scheduling is to be employed. When the cross-carrier scheduling is not used, scheduling information or assignment information of the PDSCHs 112, 122, and 132 included in the downlink CCs 110, 120, and 130 may be transmitted using the PDCCHs 111, 121, and 131 included in the corresponding downlink CCs 110, 120, and 130. Specifically, scheduling information or assignment information of the PDSCH 112 included in the downlink CC 110 may be transmitted using only the PDCCH 111 included in the downlink CC 110. Scheduling information or assignment information of the PDSCH 122 included in the downlink CC 120 may be transmitted using only the PDCCH 121 included in the downlink CC 120.

Considering uplink scheduling, a PDCCH included in a downlink CC may include scheduling information associated with a PUSCH of an uplink CC corresponding to the downlink CC.

The base station may transmit, to the terminal, information associated with correspondence relationship between an uplink CC and a downlink CC. Based on the correspondence relationship between CCs, the terminal may be aware of that a PDCCH is associated with scheduling of a PUSCH included in which uplink CC. Referring to FIG. 1, the downlink CC 110 corresponds to the uplink CC 140, and the downlink CC 120 corresponds to the uplink CC 150. In this case, scheduling information included in the PDCCH 111 may relate to the PUSCH 142, and scheduling information included in the PDCCH 121 may relate to the PUSCH 152.

The base station may include, in system information, the correspondence relationship between the CCs and thereby transmit the system information.

Figure 2:
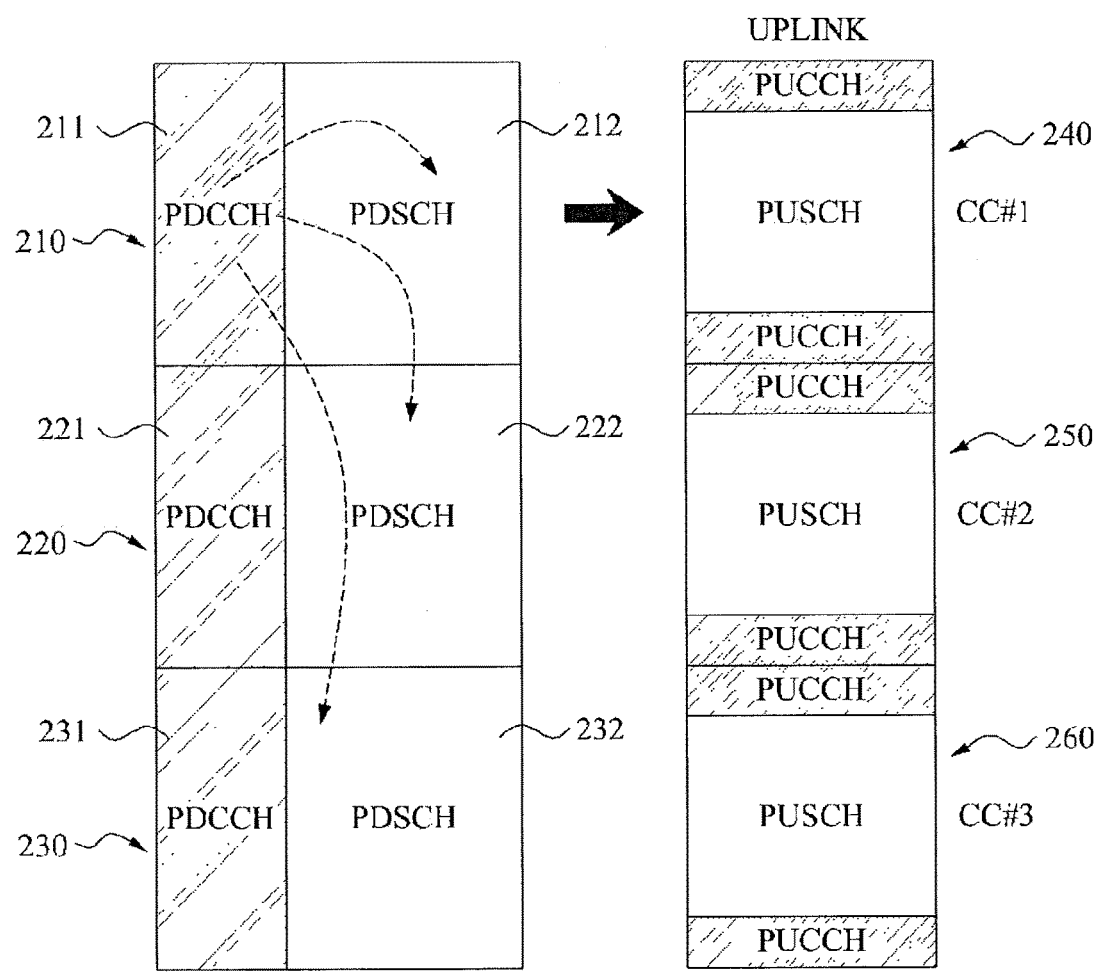
FIG. 2 is a diagram illustrating an example of a downlink grant being positioned in a single component carrier.

FIG. 2 is a diagram illustrating an example of downlink grants being positioned in a single CC. The downlink grants may be transmitted via a PDCCH and may include resource assignment information associated with downlink or uplink.

When using cross-carrier scheduling, scheduling information or assignment information of each PDSCH may be transmitted using a PDCCH of a predetermined downlink CC. In this case, the downlink CC including the PDCCH used to transmit scheduling information may correspond to the PCC.

An uplink ACK/NACK resource may be determined based on an index value of a first channel element among Control Channel Elements (CCEs) constituting the PDCCH used for the downlink grant. When data is transmitted to a plurality of CCs, the same number of PDCCHs as a number of the plurality of CCs may be used. Accordingly, when a total of N PDCCHs are used, a total of N ACK/NACK resources may be determined to be mapped by an index value of a first channel element of each PDCCH. The terminal may transmit an ACK/NACK signal using N ACK/NACK resources. The terminal may also transmit ACK/NACK by assigning an additional radio resource to an uplink PCC.

The terminal may transmit N ACK/NACK signals using a predetermined single uplink CC. As shown in FIG. 2, when a PDCCH is transmitted using only a downlink PCC, implicit resource mapping relationship of a conventional Long Term Evolution (LTE) Release 8/9 standard may be employed as is and thus, resources may be efficiently used.

Figure 3:
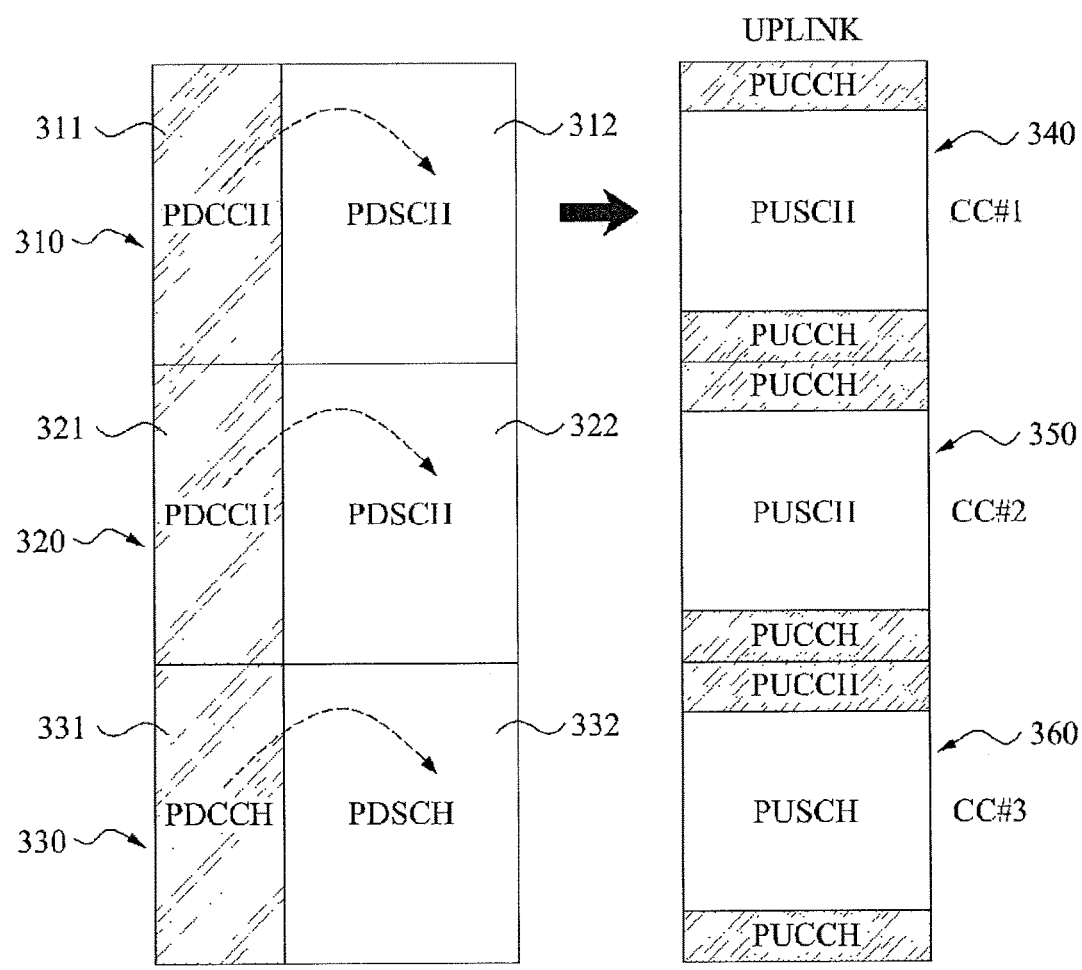
FIG. 3 is a diagram illustrating an example of a downlink grant being positioned in a plurality of component carriers.

FIG. 3 is a diagram illustrating an example of downlink grants being positioned in a plurality of CCs. Referring to FIG. 3, PDCCHs may be transmitted using a plurality of downlink CCs. However, ACK/NACK may be transmitted using a single uplink CC. Accordingly, a resource corresponding to an uplink PCC may be set with respect to a PDCCH present in each corresponding downlink CC.

Also, ACK/NACK may be transmitted by assigning an additional radio resource to the uplink PCC.

When cross-carrier scheduling is set with respect to the terminal, a carrier indicator field (CIF) within the PDCCH may be used. When the PDCCH is received using only the downlink PCC as shown in FIG. 2, the terminal may transmit ACK/NACK by selecting a resource or a sequence using PUCCH format 1a or format 1b ACK/NACK resources that are determined within the uplink PCC, based on implicit mapping relationship between ACK/NACK resources and the lowest CCE index of the PDCCH as defined in the LTE Release 8 standard. In particular, when the terminal is configured to use two downlink CCs, that is, when two downlink configured CCs are present, and when cross-carrier scheduling is set with respect to the terminal, the PDCCH may be received using only the downlink PCC at all times as shown in FIG. 2.

Even though PDSCH assignment using a dynamic PDCCH is absent in the PCC, semi-persistent scheduling (SPS) assignment may be present in the PCC. In this case, the terminal may include a persistent ACK/NACK resource corresponding to the SPS assignment in ACK/NACK channels for resource and sequence selection.

However, when all of downlink CCs are connected to the same single uplink CC, the resource and sequence selection may be performed using an uplink ACK/NACK channel that is secured based on implicit mapping relationship between a lowest CCE index of the PDCCH and the ACK/NACK resource, regardless of whether the cross-carrier scheduling is set with respect to the terminal.

When a resource is secured according to the aforementioned scheme, an additional resource may need to be secured in order to enhance the performance of ACK/NACK transmission.

According to an aspect, an uplink ACK/NACK resource may be secured by employing the implicit mapping relationship of the ACK/NACK resource disclosed in the LTE Rel-8/9 standard, and by substituting the second lowest CCE index of the PDCCH instead of substituting the lowest CCE index. In this case, the base station may need to constitute the PDCCH with minimum two CCEs.

However, in the above scheme, when an SPS is assigned to a subframe, an assigned downlink PDCCH may be absent in the subframe. In this case, since only a single ACK/NACK resource corresponding to the SPS assignment is secured in LTE, another assignment scheme may need to be employed to secure an additional resource.

According to an aspect, an additional resource may be secured using explicit signaling. As an example of the explicit signaling, the terminal may be directly notified through RRC signaling, or may be notified by assigning a single bit or a plurality of bits to a DCI (downlink control information) format for downlink scheduling. As another example, the terminal may be notified of a resource by notifying the terminal of a portion of a resource assignment position through RRC signaling, and by finally assigning the single bit or the plurality of bits to the DCI format for downlink scheduling.

When cross-carrier scheduling is not set with respect to the terminal, a PDCCH may not include the CIF. In this case, the base station may assign an ACK/NACK resource within the uplink PCC through separate RRC signaling Here, a number of ACK/NACK resources corresponding to a number of downlink configured CCs may need to be assigned. For example, when the number of downlink configured CCs is N, N PUCCH ACK/NACK resources may need to be assigned. When a PDSCH assignment using a dynamic PDCCH is present in the downlink PCC, an ACK/NACK resource determined within the uplink PCC based on implicit mapping relationship between the ACK/NACK resource and the lowest CCE index defined in the LTE Release 8 standard may be included in ACK/NACK channels for the resource and sequence selection.

Even though the PDSCH assignment using the dynamic PDCCH is absent in the downlink PCC, the SPS assignment may be present in the downlink PCC. In this case, a persistent ACK/NACK resource corresponding to the SPS assignment may be included in ACK/NACK channels for the resource and sequence selection.

The aforementioned scheme may be applicable when different uplink CCs are connected to a single downlink CC. When all of downlink CCs are connected to the same uplink CC, the resource and sequence selection may be always performed using the uplink ACK/NACK channel that is secured based on implicit mapping relationship between the ACK/NACK resource of the PDCCH and the lowest CCE index defined in the LTE Release 8/9 standard, regardless of whether cross-carrier scheduling is set with respect to the terminal.

According to an aspect, with respect to all of downlink CCs connected to the uplink PCC, the uplink ACK/NACK channel secured based on the implicit mapping relationship defined in the LTE Release 8/9 standard may be included in the ACK/NACK channel for the resource and sequence selection at all times. Even in this case, when the PDSCH assignment using the dynamic PDCCH is absent, however, the SPS assignment is present with respect to the downlink CCs connected to the uplink PCC, the persistent ACK/NACK resource corresponding to the SPS assignment may be included in ACK/NACK channels for the resource and sequence selection.

When cross-carrier scheduling is not set with respect to the terminal, the PDCCH may not include the CIF. Even in this case, an additional resource may be further secured and be included in ACK/NACK channels for the resource and sequence selection.

When a PDCCH is transmitted from the downlink PCC with respect to an uplink PCC whereby resource assignment is performed, an uplink ACK/NACK resource may be secured by employing implicit mapping relationship of the ACK/NACK resource disclosed in the LTE Release 8/9 standard, and by substituting the second lowest CCE index of the PDCCH, instead of substituting the lowest CCE index of the PDCCH. In this case, the base station may constitute the PDCCH with minimum two CCEs. However, in this scheme, when an SPS is assigned to a subframe, an assigned downlink PDCCH may be absent in the subframe. In this case, since only a single ACK/NACK resource corresponding to the SPS assignment is secured in LTE, another assignment scheme may need to be employed to secure an additional resource. The additional resource may be secured using explicit signaling. The above scheme may directly notify the terminal through RRC signaling, or may notify the terminal by assigning a single bit or a plurality of bits to a DCI format for downlink scheduling. As another scheme, the terminal may be notified of a resource by notifying the terminal of a portion of a resource assignment position through RRC signaling and by finally assigning the single bit or the plurality of bits to the DCI format for downlink scheduling.

Hereinafter, a resource assignment method for ACK/NACK feedback using a channel selection scheme will be described using examples. It may be assumed that a number of channels are assigned based on a number of bits of ACK/NACK to be transmitted as shown in Table 1.

TABLE 1

[Number of channels assigned based on number of bits of ACK/NACK]

| Number of A/N bits | Maximum number of A/N channels required for channel selection |
| --- | --- |
| 2 | 2 |
| 3 | 3 |
| 4 | 4 |

For channel selection, when a PDSCH assignment is performed using a PDCCH, minimum at least one channel may be secured from indices of CCEs constituting the PDCCH, ACK/NACK resource indication (ARI) information, and the like. When a number of transport blocks is one, a single channel may be secured. When the number of transport blocks is two, two channels may be secured.

When the PDCCH is transmitted from the downlink PCC and is used for data assignment with respect to the downlink PCC or a downlink SCC, and when a single transport block is transmitted, a single channel may be secured according to the Rel-8/9 resource assignment method using the lowest CCE index among indices of CCEs constituting the PDCCH. When two transport blocks are transmitted, two channels may be secured according to the Rel-8/9 resource assignment method using the lowest CCE index and the second lowest CCE index among indices of the CCEs constituting the PDCCH.

When the PDCCH is transmitted from the downlink PCC and a single transport block is transmitted, assignment of an additional resource may be required so that the terminal using multiple antennas may perform transmission using a Spatial Orthogonal Resource Transmit Diversity (SORTD). In this case, two channels may be secured according to the Rel-8/9 resource assignment method using the lowest CCE index and the second lowest CCE index among indices of the CCEs constituting the PDCCH.

According to another aspect, when a PDCCH is transmitted from an SCC instead of a downlink PCC, a channel may be secured according to the following scheme. The base station may notify the terminal of a parameter $n_{PUCCH,0}^{(1)}$ through RRC signaling. When the PDCCH is transmitted from the SCC instead of the downlink PCC, 2 bits within a DCI format may be used as resource assignment information. The above 2 bits may correspond to ARI. When a plurality of PDCCHs is transmitted from the SCC, all ARI may use the same value. The ARI may map $n_{ARI}$ value, and may define $n_{PUCCH}^{(1)}$ as follows:

$$n_{PUCCH}^{(1)} = n_{PUCCH,0}^{(1)} + n_{ARI}$$

For example, $n_{ARI}$ value according to an ARI bit value may be defined as shown in Table 2. $\Delta_{offset}$ may use a value predetermined in a standard, or may use a value notified from the base station to the terminal through higher layer signaling.

TABLE 2

[$n_{ARI}$ value according to ARI bit value]

| ARI | $n_{ARI}$ |
| --- | --- |
| 00 | 0 |
| 01 | $1\Delta_{offset}$ |
| 10 | $2\Delta_{offset}$ |
| 11 | $3\Delta_{offset}$ |

The terminal may determine a usage resource from $n_{PUCCH}^{(1)}$ using the same scheme as Rel-8/9. When a single transport block is transmitted, a single channel determined according to the above scheme may be secured. When two transport blocks are transmitted, one method is that the terminal may use two resources corresponding to $n_{PUCCH}^{(1)}$, $n_{PUCCH}^{(1)}+1$.

According to another aspect, when an SCC transmitting a PDCCH containing downlink scheduling information is set to a transmission mode capable of transmitting maximum two transport blocks, the base station may transmit, to the terminal using RRC signaling, four pairs of candidate values of $n_{PUCCH}^{(1)}$ with respect to the SCC. Also, when the base station selects a single pair from the four pairs based on an ARI included in DCI and an actual number of transport blocks are two, the terminal may use the selected resource pair for the channel selection. When the number of actual transport blocks is single, the terminal may use the first resource in the selected resource pair for the channel selection.

Even though a single transport block is transmitted for transmission of the terminal using multiple antennas using SORTD, the assignment of an additional resource may be required. In this case, two channels corresponding to $n_{PUCCH}^{(1)}$, $n_{PUCCH}^{(1)}+1$ may be secured for the channel selection.

A number of ACK/NACK bits to be transmitted by the terminal may be determined based on a number of configured CCs for the terminal and a transmission mode of each configured CC. That is, 2 bits may be used for a CC set to the transmission mode capable of transmitting maximum two transport blocks, and a single bit may be used for a CC set to the transmission mode capable of transmitting a maximum single transport block. When N corresponds to a total number of ACK/NACK bits to be transmitted by the terminal, $$N = \sum_{i=1}^{C_N} Q_i.$$

Here, $Q_i$ denotes a number of A/N bits with respect to an $i^{th}$ configured CC, and $C_N$ denotes the number of configured CCs for the terminal.

Two bits of ACK/NACK transmission occurs when the downlink PCC (or PCell) and a single SCC (or SCell) are configured and each is set to the transmission mode capable of transmitting maximum one transport block.

TABLE 3

[bit assignment when 2 bits of A/N transmission occurs]

| A/N bit assignment | PCell | SCell_0 |
| --- | --- | --- |
| Case 1 | 1 bit | 1 bit |

In this case, when the terminal does not use the SORTD, ACK/NACK channels required may be secured through the aforementioned scheme and be used for the channel selection. When the terminal uses the SORTD, two channels may be secured for each CC where a PDCCH occurs through the aforementioned scheme and thus, may be used for the channel selection and the SORTD transmission.

When 3 bits of ACK/NACK transmission occurs, three cases may be probable as shown in Table 4.

TABLE 4

[bit assignment when 3 bits of A/N transmission occurs]

| A/N bit assignment | PCell | SCell_0 | SCell_1 |
|---|---|---|---|
| Case 1 | 1 bit | 1 bit | 1 bit |
| Case 2 | 2 bits | 1 bit | |
| Case 3 | 1 bit | 2 bits | |

When the terminal uses SORTD, case 1 of Table 4 may secure two channels for each CC where a PDCCH occurs through the aforementioned scheme and thus, may use the secured channels for the channel selection and the SORTD transmission.

When the PDCCH occurs only in PCell, case 2 of Table 4 may secure a total of two channels. Accordingly, two channels may need to be additionally secured so that the terminal may use the SORTD. When the PDCCH occurs in both PCell and SCell, a total of four channels may be secured and thus, a remaining single channel may be used for the SORTD transmission. Specifically, the SORTD transmission may be performed using a single channel obtained as a result of the channel selection, and a remaining single channel. When the PDCCH occurs only in SCell, a total of two channels may be secured and thus, the SORTD transmission may be performed.

Case 3 of Table 4 may be similar to case 2. Here, a position of PCell and a position of SCell may be switched.

When 4 bits of ACK/NACK transmission occurs, four cases may be probable as shown in Table 5.

TABLE 5

[bit assignment when 4 bits of A/N transmission occurs]

| A/N bit assignment | PCell | SCell_0 | SCell_1 | SCell_2 |
|---|---|---|---|---|
| Case 1 | 1 bit | 1 bit | 1 bit | 1 bit |
| Case 2 | 2 bits | 1 bit | 1 bit | |
| Case 3 | 1 bit | 2 bits | 1 bit | |
| Case 4 | 2 bits | 2 bits | | |

When the terminal uses SORTD, case 1 of Table 5 may secure two channels for each CC where a PDCCH occurs through the aforementioned scheme and thus, may use the secured channels for the channel selection and the SORTD transmission.

When the PDCCH occurs in all of CCs, case 2 of Table 5 may secure a total of six channels. Accordingly, four channels may be used for the channel selection. The terminal may perform the SORTD transmission by selecting a single channel from remaining two channels. Specifically, the terminal may perform the SORTD transmission using a single channel obtained as a result of the channel selection and another channel among the remaining two channels, which is pre-defined in the standard.

When the PDCCH occurs in all of CCs, case 3 of Table 5 may secure a total of six channels. Accordingly, four channels may be used for the channel selection. The terminal may perform the SORTD transmission by selecting a single channel from remaining two channels. Specifically, the terminal may perform the SORTD transmission using a single channel obtained as a result of the channel selection and another channel among the remaining two channels, which is pre-defined in the standard.

Case 4 of Table 5 may secure a total of four channels and thus, may perform the channel selection using the four channels. The SORTD transmission may not be allowed.

It may be difficult for the terminal using a discrete Fourier transform (DFT)-S-orthogonal frequency division multiplexing (OFDM) based transmission method to perform code division multiplexing (CDM) with respect to a resource block with other terminals using a PUCCH resource defined in LTE Rel-8/9. Accordingly, an ACK/NACK resource within an uplink PCC may be separately assigned through RRC signaling. The above resource may be referred to as a carrier aggregation (CA) PUCCH ACK/NACK resource. An assignment position of the CA PUCCH ACK/NACK resource may be within an area for existing Rel-8/9 PUCCH channel quality information (CQI), persistent ACK/NACK, and a scheduling request resource, and may not fringe a dynamic ACK/NACK resource area mapped by the lowest CCE index of the PDCCH. When the CA PUCCH ACK/NACK resource fringes the dynamic ACK/NACK resource area, the terminal may collide with another terminal using the dynamic ACK/NACK resource. The base station may notify the terminal of a time-domain sequence and a position of a radio resource block used at the terminal.

According to an aspect, the base station may notify the terminal of a radio resource by notifying the terminal of a portion of a resource assignment position through RRC signaling, and by finally assigning a single bit or a plurality of bits to a DCI format for downlink scheduling.

Regardless of the above transmission scheme, when the terminal receives a downlink assignment with respect to only a single downlink CC in a subframe and when the assigned CC is the downlink PCC, the terminal may be assigned with an ACK/NACK resource using the same scheme as LTE Rel-8/9, and may perform transmission using the same transmission scheme as LTE Rel-8/9.

Even though a PDSCH assignment using a dynamic PDCCH is absent in the downlink PCC, an SPS assignment may be present in the PCC. In this case, the terminal may use a persistent ACK/NACK resource corresponding to the SPS assignment and may perform transmission using the same transmission scheme as LTE Rel-8/9.

Hereinafter, a resource assignment when ACK/NACK feedback is performed based on DFT-S-OFDM will be described.

Figure 6:
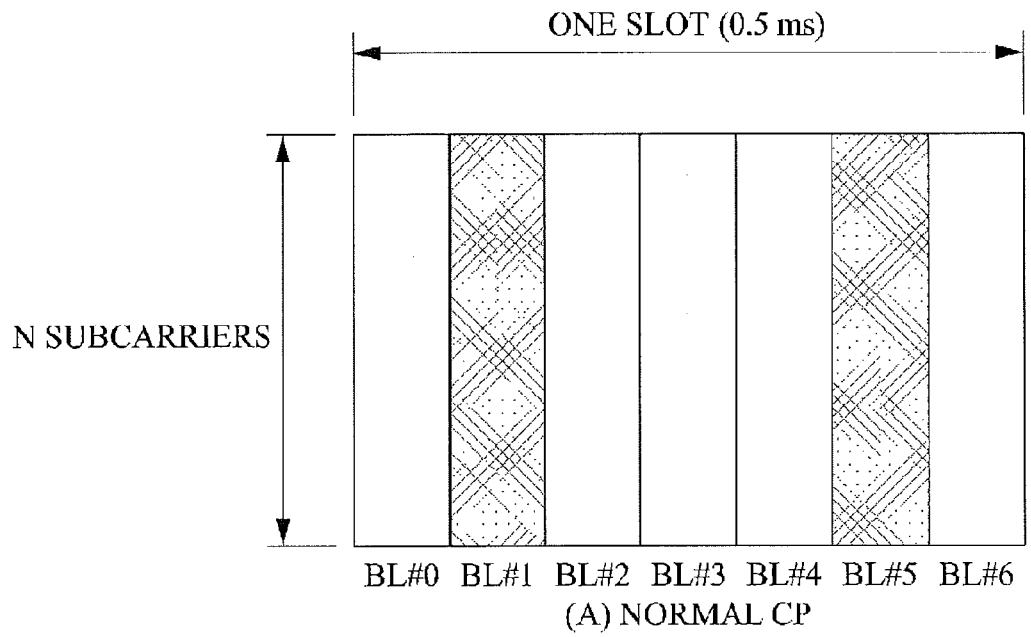
FIG. 6 is a diagram illustrating a channel structure according to another embodiment of the present invention.
Figure 6:
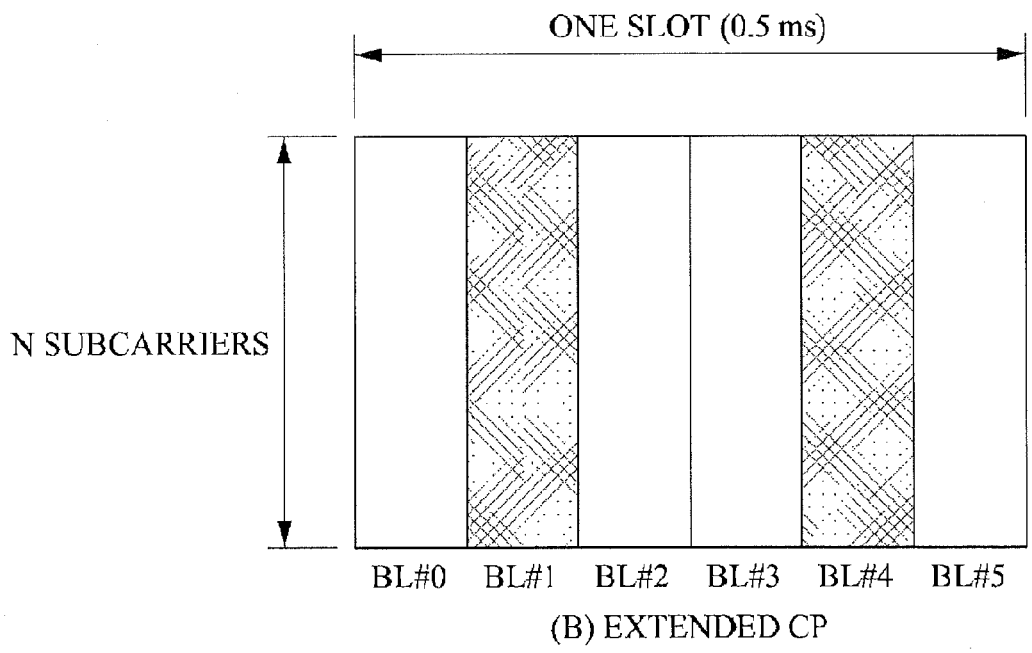

When a normal cyclic prefix (CP) is used, a structure of having two reference signals per slot as shown in a part (A) of FIG. 6 may be used. When an extended CP is used, a structure of having a single reference signal per slot as shown in a part (B) of FIG. 7 may be used.

When the extended CP is used, a position of a reference signal may be BL#3. In a subframe where a sounding reference signal (SRS) is not transmitted, when the normal CP is used, maximum five terminals may be multiplexed to a single resource block. When the extended CP is used, maximum four terminals may be multiplexed to a single resource block.

In a subframe where the SRS is transmitted, the last symbol of the second slot may not be transmitted. Accordingly, in the subframe where the SRS is transmitted, when the normal CP is used, maximum four terminals may be multiplexed to a single resource block. When the extended CP is used, maximum three terminals may be multiplexed to a single resource block.

The base station may notify the terminal of parameter $n_{PUCCH,0}^{(3)}$ through RRC signaling. When a PDCCH is transmitted from an SCC, 2 bits within a DCI format may be used as resource assignment information. The above 2 bits may be referred to as ARI. When a plurality of PDCCHs is transmitted from the SCC, all of ARI may use the same value. The ARI may map $n_{ARI}$ value and may define $n_{(PUCCH)}^{(3)}$ as follows.

$$n_{PUCCH}^{(3)}=n_{PUCCH,0}^{(3)}+n_{ARI}$$

For example, $n_{ARI}$ value according to an ARI bit value may be defined as shown in Table 6. $\Delta_{offset}$ may use a value predetermined in the standard, or may use a value notified from the base station to the terminal through higher layer signaling.

TABLE 6

[$n_{ARI}$ value according to ARI bit value]

| ARI | $n_{ARI}$ |
|---|---|
| 00 | 0 |
| 01 | $1\Delta_{offset}$ |
| 10 | $2\Delta_{offset}$ |
| 11 | $3\Delta_{offset}$ |

According to another aspect, the base station may perform RRC signaling of four candidate values of $n_{PUCCH}^{(3)}$ with respect to the terminal, and may select one candidate value from the four candidate values based on ARI included in a DCI.

The terminal may determine, from $n_{PUCCH}^{(3)}$, a position of a physical resource block (PRB) and a time-domain orthogonal sequence to be used. A resource to be used by the terminal may be indicated as the following two resource indices.

$n_{PRB}$: PRB index
$n_{oc}$: time-domain orthogonal sequence index
$n_{PRB}$ may be obtained from the same equation as Rel-8/9, as follows:

$$n_{PRB} = \begin{cases} \left\lfloor \frac{m}{2} \right\rfloor & \text{if } (m+n_s\text{mod}2)\text{mod}2 = 0 \\ N_{RB}^{UL} - 1 - \left\lfloor \frac{m}{2} \right\rfloor & \text{if } (m+n_s\text{mod}2)\text{mod}2 = 1 \end{cases},$$

1) First Method for Assigning a Radio Resource:
Initially, new parameters may be defined as follows:
$N_{SF,1}$: may have a value of 4 or 5 as the spreading factor of slot #1 corresponding to the second slot.
$N_{RB}^{(3)}$: RB offset for DFT-S-OFDM A/N resource
m and $n_{oc}$ may be obtained according to the following equations.

$$m=\lfloor n_{PUCCH}^{(3)}/N_{SF,1}\rfloor+N_{RB}^{(3)}.$$

$$n_{oc}=n_{PUCCH}^{(3)}\text{mod } N_{SF,1}$$

When the terminal using multiple antennas performs transmission using SORTD, two resources may need to be assigned. For this, the base station may notify the terminal of parameters $n_{PUCCH,0}^{(3)}$ and $n_{PUCCH,1}^{(3)}$ through RRC signaling. $n_{PUCCH,SORTD0}^{(3)}$ and $n_{PUCCH,SORTD1}^{(3)}$ may be determined by $n_{PUCCH,1}^{(3)}$ and $n_{ARI}$ as follows:

$$n_{PUCCH,SORTD0}^{(3)}=n_{PUCCH,0}^{(3)}+n_{ARI}$$

$$n_{PUCCH,SORTD1}^{(3)}=n_{PUCCH,1}^{(3)}+n_{ARI}$$

The terminal may use two resources that may be obtained using the same method as the aforementioned single resource assignment, that is, a method of substituting $n_{PUCCH,SORTD0}^{(3)}$ and $n_{PUCCH,SORTD1}^{(3)}$ instead of $n_{PUCCH}^{(3)}$ used for the single resource assignment. Specifically, a single antenna port may be transmitted using a resource obtained with $n_{PUCCH,SORTD0}^{(3)}$, and another antenna port may be transmitted using a resource obtained with $n_{PUCCH,SORTD1}^{(3)}$.

As another method, the base station may transmit, to the terminal, four pairs of candidate values of $n_{PUCCH,SORTD0}^{(3)}$ and $n_{PUCCH,SORTD1}^{(3)}$ through RRC signaling, and may select a single pair from the four pairs based on ARI included in DCI.

Decision of demodulation reference signal sequence: The terminal may determine, from $n_{oc}$, a cyclic shift of a demodulation reference signal sequence to be used by the terminal.

In a case where $N_{SF,1}=4$, when $n_s$ mod 2=0, $n'(n_s)=(3n_{oc})$ mod $N_{sc}^{RB}$. Here, $n_s$ denotes a slot number.

In a case where $N_{SF,1}=5$, when $n_s$ mod 2=0, $n'(n_s)$ may be determined from the following Table 7. Through signaling, the base station may notify the terminal in advance of which case of Table 1 is being used. As another method, when deltaPUCCH-Shifts $\Delta_{shift}^{PUCCH}=3$, case 2 may be used and otherwise, case 1 may be used. Here, deltaPUCCH-Shift $\Delta_{shift}^{PUCCH}$ denotes a parameter indicating a cyclic shift interval in PUCCH format 1/1a/1b.

TABLE 7

[decision of demodulation reference signal sequence according to $n_{oc}$ value]

| $n_{oc}$ | Case 1: $n'(n_s)$ | Case 2: $n'(n_s)$ |
|---|---|---|
| 0 | 0 | 0 |
| 1 | 3 | 3 |
| 2 | 6 | 6 |
| 3 | 8 | 9 |
| 4 | 10 | |

When $n_s$ mod 2=1, $n'(n_s)$ may be determined according to the following equation regardless of $N_{SF,1}$.

$$n'(n_s)=[N_{sc}^{RB}(n'(n_s-1)+1))] \text{ mod}(N_{sc}^{RB}+1)-1$$

Using the same method as Rel-8/9, cyclic shift $\alpha(n_s,l)$ used by the terminal may be determined as follows:

$$\alpha(n_s,l)=2\pi\cdot n_{cs}(n_s,l)/N_{sc}^{RB}$$

$$n_{cs}(n_s,l)=(n_{cs}^{cell}(n_s,l)+n'(n_s)) \text{mod } N_{SC}^{RB}$$

2) Second Method for Assigning a Radio Resource:
Initially, new parameters may be defined as follows:
$N_{MF}$: multiplexing factor
$N_{SF,1}$: spreading factor of slot #0 corresponding to a first slot
$N^{SF,0}$: spreading factor of slot #1 corresponding to a second slot $$N_{MF} = \min\left(N_{SF,1}, \left\lfloor \frac{N_{sc}^{RB}}{\Delta_{shift}^{PUCCH}} \right\rfloor\right)$$

$N_{RB}^{(3)}$: RB offset for DFT-S-OFDM A/N resource
m and $n_{oc}$ may be calculated according to the following equations.

$$m=\lfloor n_{PUCCH}^{(3)}/N_{SF,0}\rfloor+N_{RB}^{(3)}.$$

$$n_{oc}=n_{PUCCH}^{(3)}\text{mod } N_{MF}$$

When the terminal using multiple antennas employs SORTD, two resources may need to be assigned. In this case, the base station may notify the terminal of parameters $n_{PUCCH,0}^{(3)}$ and $n_{PUCCH,1}^{(3)}$ through RRC signaling. $n_{PUCCH,SORTD0}^{(3)}$ and $n_{PUCCH,SORTD1}^{(3)}$ may be determined by $n_{PUCCH,1}^{(3)}$ and $n_{ARI}$ as follows:

$$n_{PUCCH,SORTD0}^{(3)} = n_{PUCCH,0}^{(3)} + n_{ARI}$$

$$n_{PUCCH,SORTD1}^{(3)} = n_{PUCCH,1}^{(3)} + n_{ARI}$$

The terminal may use two resources that may be obtained using the same method as the aforementioned single resource assignment, that is, a method of substituting $n_{PUCCH,SORTD0}^{(3)}$ and $n_{PUCCH,SORTD1}^{(3)}$ instead of $n_{PUCCH}^{(3)}$ used for the single resource assignment. Specifically, a single antenna port may be transmitted using a resource obtained with $n_{PUCCH,SORTD0}^{(3)}$, and another antenna port may be transmitted using a resource obtained with $n_{PUCCH,SORTD1}^{(3)}$.

As another method, the base station may transmit, to the terminal, four pairs of candidate values of $n_{PUCCH,SORTD0}^{(3)}$ and $n_{PUCCH,SORTD1}^{(3)}$ through RRC signaling, and may select a single pair form the four pairs based on ARI included in DCI.

Decision of demodulation reference signal sequence: The terminal may determine, from $n_{oc}$, a cyclic shift of a demodulation reference signal sequence to be used by the terminal.

When $n_s$ mod 2=0, $n'(n_s)$ may be determined with respect to each of $N_{MF}=4$ and $N_{MF}=5$ according to the following Table 8.

TABLE 8

[decision of demodulation reference signal sequence]

| | n'(n$_s$) | |
|---|---|---|
| n$_{oc}$ | N$_{MF}$ = 5 | N$_{MF}$ = 4 |
| 0 | 0 | 0 |
| 1 | 6 | 6 |
| 2 | 3 | 3 |
| 3 | 8 | 9 |
| 4 | 10 | N.A. |

Instead of Table 8, Table 9 may be employed. Compared to Table 8, Table 9 assigns $n_{oc}$ while sequentially increasing $n_{oc}$. Accordingly, when a small number of terminals are assigned, a cyclic shift interval of the demodulation reference sequence may be maintained to be great.

TABLE 9

[decision of demodulation reference signal sequence]

| | n'(n$_s$) | |
|---|---|---|
| n$_{oc}$ | N$_{MF}$ = 5 | N$_{MF}$ = 4 |
| 0 | 0 | 0 |
| 1 | 3 | 3 |
| 2 | 6 | 6 |
| 3 | 8 | 9 |
| 4 | 10 | N.A. |

When $n_s$ mod 2=1, $n'(n_s)$ may be determined according to the following equation.

$$n'(n) = [N_{sc}^{RB}(n'(n_s-1)+1))] \bmod (N_{sc}^{RB}+1) - 1$$

Using the same method as Rel-8/9, cyclic shift $\alpha(n_s,l)$ used by the terminal may be determined as follows.

$$\alpha(n_s,l) = 2\pi \cdot n_{cs}(n_s,l)/N_{sc}^{RB}$$

$$n_{cs}(n_s,l) = (n_{sc}^{cell}(n_s,l) + n'(n_s)) \bmod N_{SC}^{RB}$$

3) Third Method for Assigning Radio Resource:
Initially, new parameters may be defined as follows:
$N_{MF,0}$: multiplexing factor of the first slot
$N_{MF,1}$: multiplexing factor of the second slot
$N_{SF,1}$: spreading factor of the first slot
$N_{SF,0}$: spreading factor of the second slot $$N_{MF,0} = \min\left(N_{SF,0}, \left\lfloor \frac{N_{sc}^{RB}}{\Delta_{shift}^{PUCCH}} \right\rfloor \right)$$

$$N_{MF,1} = \min\left(N_{SF,1}, \left\lfloor \frac{N_{sc}^{RB}}{\Delta_{shift}^{PUCCH}} \right\rfloor \right)$$

$N_{RB}^{(3)}$: RB offset for DFT-S-OFDM A/N resource
PRB index m may be calculated according to the following equation.

$$m = \lfloor n_{PUCCH}^{(3)} / N_{MF,0} \rfloor + N_{RB}^{(3)}.$$

An advantage of the above scheme lies in that a resource area may be set based on $N_{MF,0}$ corresponding to an actual multiplexing capability of the normal format.

A time-domain sequence index $n_{oc,0}$ of the first slot may be calculated according to the following equation.

$$n_{oc,0} = n_{PUCCH}^{(3)} \bmod N_{MF,1}$$

The following equation may also be employed.

$$n_{oc,0} = (n_{PUCCH}^{(3)} \bmod N_{MF,0}) \bmod N_{MF,1}$$

A time-domain sequence index $n_{oc,1}$ of the second slot may apply slot level remapping.

When the terminal using multiple antennas employs SORTD, two resources may need to be assigned. For this, the base station may notify the terminal of parameters $n_{PUCCH,0}^{(3)}$ and $n_{PUCCH,1}^{(3)}$ through RRC signaling. $n_{PUCCH,SORTD0}^{(3)}$ and $n_{PUCCH,SORTD1}^{(3)}$ may be determined by $n_{PUCCH,1}^{(3)}$ and $n_{ARI}$ as follows:

$$n_{PUCCH,SORTD0}^{(3)} = n_{PUCCH,0}^{(3)} + n_{ARI}$$

$$n_{PUCCH,SORTD1}^{(3)} = n_{PUCCH,1}^{(3)} + n_{ARI}$$

The terminal may use two resources that may be obtained using the same method as the aforementioned single resource assignment, that is, a method of substituting $n_{PUCCH,SORTD0}^{(3)}$ and $n_{PUCCH,SORTD1}^{(3)}$ instead of $n_{PUCCH}^{(3)}$ used for the single resource assignment. Specifically, a single antenna port may be transmitted using a resource obtained with $n_{PUCCH,SORTD0}^{(3)}$, and another antenna port may be transmitted using a resource obtained with $n_{PUCCH,SORTD1}^{(3)}$.

As another method, the base station may transmit, to the terminal, four pairs of candidate values of $n_{PUCCH,SORTD0}^{(3)}$ and $n_{PUCCH,SORTD1}^{(3)}$ through RRC signaling, and may select a single pair form the four pairs based on ARI included in DCI.

Decision of demodulation reference signal sequence: A cyclic shift of a demodulation reference signal to be used by the terminal may be determined from $n_{oc,0}$. Using a method similar to Rel-8/9, a cyclic shift $\alpha(n_s,l)$ used by the terminal may be determined as follows:

$$\alpha(n_s,l) = 2\pi \cdot n_{cs}(n_s,l)/N_{sc}^{RB}$$

$$n_{cs}(n_s,l) = (n_{sc}^{cell}(n_s,l) + n'(n_s,l)) \bmod N_{SC}^{RB}$$

In the Case of Normal CP:

Since a single slot includes two reference signal blocks l=1 (BL #1) and l=5 (BL #5), n'($n_s$,l) assigned from a first reference signal block may be set to be changed in a second reference block. This is to enable code division multiplexed terminals to randomize mutual interference.

When l=1 n'(n,l) may be determined according to Table 10.

TABLE 10

| | n'($n_s$, l) | |
|---|---|---|
| $n_{oc}$ | $N_{MF, l} = 5$ | $N_{MF, l} = 4$ |
| 0 | 0 | 0 |
| 1 | 6 | 6 |
| 2 | 3 | 3 |
| 3 | 8 | 9 |
| 4 | 10 | N.A. |

Instead of employing Table 10, one of Table 11 and Table 12 may be employed.

TABLE 11

| | n'($n_s$, l) | |
|---|---|---|
| $n_{oc}$ | $N_{MF, l} = 5$ | $N_{MF, l} = 4$ |
| 0 | 0 | 0 |
| 1 | 3 | 3 |
| 2 | 6 | 6 |
| 3 | 8 | 9 |
| 4 | 10 | N.A. |

TABLE 12

| | n'($n_s$, l) | |
|---|---|---|
| $n_{oc}$ | $N_{MF, l} = 5$ | $N_{MF, l} = 4$ |
| 0 | 0 | 0 |
| 1 | 3 | 3 |
| 2 | 5 | 6 |
| 3 | 8 | 9 |
| 4 | 10 | N.A. |

When l=5, n'($n_s$,l) may be expressed according to the following equation.

$$n'(n_s,l)=[N_{sc}^B(n'(n_s,1)+1)] \bmod(N_{sc}^{RB}+1)-1$$

In the Case of Extended CP:

A single slot may include a single reference signal block l=3 (BL #3). n'($n_s$,l) assigned from a reference signal block belonging to a first slot may be set to be changed in a reference block belonging to a second slot. This is to enable code division multiplexed terminals to randomize mutual interference.

When l=3 and $n_s$ mod 2=0, n'($n_s$,l) may be expressed according to Table 11 or Table 12.

When l=3 and $n_s$ mod 2=1, n'($n_s$,l) may be expressed according to the following equation.

$$n'(n_s,l)=[N_{sc}^{RB}(n'(n_s-1,3)+1)] \bmod(N_{sc}^{RB}+1)-1.$$

According to the 3$^{rd}$ Generation Partnership Project (3GPP) LTE Release 8 standard, a PUCCH transmission format for transmission of uplink control information may follow as:

Format 1/1a/1b: SR, ACK/NACK
Format 2/2a/2b: CQI, CQI+ACK/NACK

Due to the following reasons, transmission of uplink control information (UCI) of an LTE-Advanced (Release 10 and following Release) system may need a change:

First, using a plurality of carriers

Second, applying enhanced Multiple Input Multiple Output (MIMO) technology and Coordinated Multi-Point (CoMP) technology.

Due to the above reasons, there is a need to increase UCI payload.

Hereinafter, a method of generating, by the terminal, and transmitting an ACK/NACK signal corresponding to a plurality of CCs will be described.

Method 1—Method of Selecting a Carrier Level Resource and Thereby Performing Transmission:

For example, the above method may correspond to a case where a data transmission is performed through two downlink CCs and a corresponding grant channel is transmitted to each of the downlink CCs. Here, uplink CCs corresponding to the respective downlink CCs may be predetermined.

When each downlink CC transmits a single transport block, the terminal may need to transmit an ACK/NACK signal with respect to two transport blocks. Two uplink CCs corresponding to two downlink CCs may be present. To transmit the ACK/NACK signal corresponding to two transport blocks, the terminal may transmit a signal capable of identifying information corresponding to 2 bits. The terminal may transmit, to the base station, information corresponding to a total of 2 bits through selection of an uplink CC and a binary phase shift keying (BPSK) signal transmission in the selected uplink CC. For example, when a signal transmission CC is selected from UL-CC0 and UL-CC1 as shown in Table 13 and a BPSK modulation is performed, the terminal may transmit a signal corresponding to 2 bits. The base station may identify information by detecting the uplink CC from which the signal is transmitted, and by detecting a transmission symbol.

TABLE 13

| ACK/NACK bit value | signal transmission CC | transmission symbol |
|---|---|---|
| 00 | UL-CC0 | 0 |
| 01 | UL-CC0 | 1 |
| 10 | UL-CC1 | 0 |
| 11 | UL-CC1 | 1 |

An advantage of the above scheme lies in that the cubic metric (CM) increase does not occur. In general, a terminal positioned at a cell boundary may have some constraints in transmit power and thus, the above scheme may be advantageous in securing the coverage.

As another method, a method of transmitting 2-bit information through a quadrature phase shift keying (QPSK) modulation using a single CC may be employed. However, this scheme may need an increase in a transmit power by about 3 dB, that is, about twice in order to show the same performance as the aforementioned scheme.

Hereinafter, a method of transmitting ACK/NACK when a downlink grant channel is positioned in a single CC and an uplink ACK/NACK transmission also occurs in the single CC will be described. In this case, a method of selecting a channel level resource within the same carrier and thereby transmitting the selected resource may be employed.

Method 2—Method of Selecting a Channel Level Resource within the Same Carrier and Thereby Transmitting the Selected Resource:

In a case where a data transmission is performed through two downlink CCs and a grant channel is transmitted to a single downlink CC, a single uplink CC for transmitting ACK/NACK may be predetermined.

When the single uplink CC for transmitting ACK/NACK is referred to as UL-CC0 and two ACK/NACK channels assigned within UL-CC0 are classified as CH0 and CH1, a signal transmission channel may be selected from CH0 and CH1 as shown in Table 14. When a BPSH modulation is performed, ACK/NACK corresponding to 2 bits may be transmitted. The base station may identify ACK/NACK through detection of a transmission symbol and detection of a channel corresponding to a signal transmission in UL-CC0.

TABLE 14

[transmission symbol and channel for transmitting ACK/NACK]

| ACK/NACK bit value | signal transmission channel | transmission symbol |
|---|---|---|
| 00 | CH0 | 0 |
| 01 | CH0 | 1 |
| 10 | CH1 | 0 |
| 11 | CH1 | 1 |

Hereinafter, a method of transmitting ACK/NACK and a scheduling request using a channel selection method will be described.

1) Method of Transmitting ACK/NACK Using Scheduling Request Resource:

The terminal may simultaneously transmit ACK/NACK and a scheduling request in a single subframe. In this case, the terminal may be assigned in advance with a resource for the scheduling request, and may transmit a scheduling request signal using the assigned scheduling request resource only when the terminal needs to send scheduling request to the base station.

If the terminal determines that ACK/NACK transmission in response to downlink data transmission only in the downlink PCC and the scheduling request occur in the same subframe, the terminal may transmit ACK/NACK using the scheduling request resource instead of using an ACK/NACK resource, which is similar to Rel-8/9.

It may be assumed that ACK/NACK transmission uses one of the aforementioned channel selection schemes. Specifically, a number of channels assigned according to a number of bits of ACK/NACK to be transmitted may be assumed as shown in Table 15.

TABLE 15

[number of channels assigned according to a number of ACK/NACK bits]

| Number of A/N bits | Maximum number of A/N channels required for channel selection |
|---|---|
| 2 | 2 |
| 3 | 3 |
| 4 | 4 |

Channel selection mapping relationship according to the number of ACK/NACK bits may need to be predefined. For example, when the number of A/N bits is Q, a Q-bit channel selection mapping table corresponding thereto may be defined.

When the terminal needs to transmit ACK/NACK in a subframe where scheduling request transmission does not occur, the channel selection may be performed based on the channel selection mapping relationship predefined according to the number of bits of ACK/NACK to be transmitted.

The number of ACK/NACK bits to be transmitted by the terminal may be determined based on the number of configured CCs for the terminal and the transmission mode of configured CCs. For example, 2 bits may be used for a CC configured with a transmission mode capable of transmitting maximum two transport blocks, and 1 bit may be used for a CC configured with a transmission mode capable of transmitting a maximum single transport block. When N denotes a total number of ACK/NACK bits, $$N = \sum_{i=1}^{C_N} Q_i.$$

Here, $Q_i$ denotes the number of ACK/NACK bits with respect to an $i^{th}$ configured CC, and $C_N$ denotes the number of configured CCs for the terminal.

A case where the terminal needs to transmit ACK/NACK in a subframe where scheduling request transmission may occur will be described. In this case, a resource for the scheduling request transmission is secured in the subframe and thus, the total number of available resources may increase by one compared to a case where only ACK/NACK transmission occurs. Accordingly, channel selection may be performed based on channel selection mapping relationship that is obtained by further adding a single bit to the number of ACK/NACK bits. Specifically, the channel selection mapping table used by the terminal in the subframe where the scheduling request transmission may occur may be expressed as shown in Table 16.

TABLE 16

[channel selection mapping table used by the terminal in the subframe where the scheduling request transmission may occur]

| Number of A/N bits | channel selection mapping table |
|---|---|
| 2 | 3-bit table |
| 3 | 4-bit table |
| 4 | 5-bit table |

When the occurrence of the scheduling request is considered as ACK and the non-occurrence of the scheduling request is considered as NACK or discontinuous transmission (DTX), the channel selection mapping table generated for ACK/NACK may be employed even in a subframe where the scheduling request and ACK/NACK simultaneously occur.

For example, the 3-bit A/N table may be assumed as Table 17.

TABLE 17

[3-bit A/N Table]

| b0 | b1 | b2 | transmission channel | transmission symbol |
|---|---|---|---|---|
| D | N/D | N/D | no transmission | null |
| N | N/D | N/D | Ch0 | 1 |
| A | N/D | N/D | Ch0 | −1 |
| N/D | A | N/D | Ch1 | −j |
| A | A | N/D | Ch1 | j |
| N/D | N/D | A | Ch2 | 1 |

TABLE 17-continued

[3-bit A/N Table]

| b0 | b1 | b2 | transmission channel | transmission symbol |
|---|---|---|---|---|
| A | N/D | A | Ch2 | j |
| N/D | A | A | Ch2 | −j |
| A | A | A | Ch2 | −1 |

Referring to Table 17, N/D may be mapped to negative SR corresponding to the non-occurrence of the scheduling request and A may be mapped to positive SR corresponding to the occurrence of the scheduling request by considering b2 as scheduling request information. Using the above method, a table for 2-bit A/N and the scheduling request may be generated from the 3-bit A/N mapping table. The table may be expressed by Table 18.

TABLE 18

[table for 2-bit A/N and SR]

| b0 | b1 | SR | transmission channel | transmission symbol |
|---|---|---|---|---|
| D | N/D | Negative | no transmission | null |
| N | N/D | Negative | Ch0 | 1 |
| A | N/D | Negative | Ch0 | −1 |
| N/D | A | Negative | Ch1 | −j |
| A | A | Negative | Ch1 | j |
| N/D | N/D | Positive | Ch2 | 1 |
| A | N/D | Positive | Ch2 | j |
| N/D | A | Positive | Ch2 | −j |
| A | A | Positive | Ch2 | −1 |

For example, the 4-bit A/N table may be assumed as Table 19.

TABLE 19

[4-bit A/N table]

| b0 | b1 | b2 | b3 | transmission channel | transmission symbol |
|---|---|---|---|---|---|
| D | N/D | N/D | N/D | no transmission | null |
| N | N/D | N/D | N/D | Ch0 | 1 |
| A | N/D | N/D | N/D | Ch0 | −1 |
| N/D | A | N/D | N/D | Ch1 | −j |
| A | A | N/D | N/D | Ch1 | j |
| N/D | N/D | A | N/D | Ch2 | 1 |
| A | N/D | A | N/D | Ch2 | j |
| N/D | A | A | N/D | Ch2 | −j |
| A | A | A | N/D | Ch2 | −1 |
| N | N/D | N/D | A | Ch3 | 1 |
| A | N/D | N/D | A | Ch0 | −j |
| N/D | A | N/D | A | Ch3 | j |
| A | A | N/D | A | Ch0 | j |
| N/D | N/D | A | A | Ch3 | −j |
| A | N/D | A | A | Ch3 | −1 |
| N/D | A | A | A | Ch1 | 1 |
| A | A | A | A | Ch1 | −1 |

Referring to Table 19, N/D may be mapped to negative SR corresponding to the non-occurrence of the scheduling request and A may be mapped to positive SR corresponding to the occurrence of the scheduling request by considering b3 as scheduling request information. Using the above method, a table for 3-bit A/N and the scheduling request may be generated from the 4-bit A/N mapping table. The table may be expressed by Table 20.

TABLE 20

[table for 3-bit A/N and SR]

| b0 | b1 | b2 | SR | transmission channel | transmission symbol |
|---|---|---|---|---|---|
| D | N/D | N/D | Negative | no transmission | null |
| N | N/D | N/D | Negative | Ch0 | 1 |
| A | N/D | N/D | Negative | Ch0 | −1 |
| N/D | A | N/D | Negative | Ch1 | −j |
| A | A | N/D | Negative | Ch1 | j |
| N/D | N/D | A | Negative | Ch2 | 1 |
| A | N/D | A | Negative | Ch2 | j |
| N/D | A | A | Negative | Ch2 | −j |
| A | A | A | Negative | Ch2 | −1 |
| N | N/D | N/D | Positive | Ch3 | 1 |
| A | N/D | N/D | Positive | Ch0 | −j |
| N/D | A | N/D | Positive | Ch3 | j |
| A | A | N/D | Positive | Ch0 | j |
| N/D | N/D | A | Positive | Ch3 | −j |
| A | N/D | A | Positive | Ch3 | −1 |
| N/D | A | A | Positive | Ch1 | 1 |
| A | A | A | Positive | Ch1 | −1 |

As another example, the 3-bit A/N table may be assumed as Table 21.

TABLE 21

[3-bit A/N mapping table]

| | | transmission channel & transmission symbol | | |
|---|---|---|---|---|
| CC0 | CC1 | CH1 | CH2 | CH3 |
| A, A | A | | −1 | |
| A, N | A | | j | |
| N, A | A | | −j | |
| N, N | A | | | −1 |
| A, A | N | −1 | | |
| A, N | N | j | | |
| N, A | N | −j | | |
| N, N | N | | | 1 |
| A, A | D | −1 | | |
| A, N | D | j | | |
| N, A | D | −j | | |
| N, N | D | 1 | | |
| D, D | A | | | −1 |
| D, D | N | | | 1 |
| D, D | D | no transmission | | |

Referring to Table 21, N/D may be mapped to negative SR corresponding to the non-occurrence of the scheduling request and A may be mapped to positive SR corresponding to the occurrence of the scheduling request by considering a second bit of CC0 as scheduling request information. Using the above method, a table for 2-bit A/N and the scheduling request may be generated from the 3-bit A/N mapping table. The table may be expressed by Table 22.

TABLE 22

[mapping table for 2-bit A/N and SR]

| | | transmission channel & transmission symbol | | |
|---|---|---|---|---|
| CC0 | CC1 | CH1 | CH2 | CH3 |
| A, Positive | A | | −1 | |
| A, Negative | A | | j | |
| N, Positive | A | | −j | |
| N, Negative | A | | | −1 |
| A, Positive | N | −1 | | |
| A, Negative | N | j | | |

TABLE 22-continued

[mapping table for 2-bit A/N and SR]

| CC0 | CC1 | transmission channel & transmission symbol | | |
|---|---|---|---|---|
| | | CH1 | CH2 | CH3 |
| N, Positive | N | −j | | |
| N, Negative | N | | | 1 |
| A, Positive | D | −1 | | |
| A, Negative | D | j | | |
| N, Positive | D | −j | | |
| N, Negative | D | 1 | | |
| D, Negative | A | | | −1 |
| D, Negative | N | | | 1 |
| D, Positive | A | | −j | |
| D, Positive | N | | 1 | |
| D, Positive, | D | | 1 | |
| D, Negative | D | no transmission | | |

As another example, the 4-bit A/N table may be assumed as Table 23.

TABLE 23

[4-bit A/N table]

| CC0 | CC1 | transmission channel & transmission symbol | | | |
|---|---|---|---|---|---|
| | | CH1 | CH2 | CH3 | CH4 |
| A, A | A, A | | −1 | | |
| A, N | A, A | | | −j | |
| N, A | A, A | | −j | | |
| N, N | A, A | | | | −1 |
| A, A | A, N | | j | | |
| A, N | A, N | | | 1 | |
| N, A | A, N | | 1 | | |
| N, N | A, N | | | | j |
| A, A | N, A | | −1 | | |
| A, N | N, A | | | j | |
| N, A | N, A | | | | −j |
| N, N | N, A | | | | 1 |
| A, A | N, N | −1 | | | |
| A, N | N, N | j | | | |
| N, A | N, N | −j | | | |
| N, N | N, N | 1 | | | |
| A, A | D, D | −1 | | | |
| A, N | D, D | j | | | |
| N, A | D, D | −j | | | |
| N, N | D, D | 1 | | | |
| D, D | A, A | | | | −1 |
| D, D | A, N | | | | j |
| D, D | N, A | | | | 1 |
| D, D | N, N | No transmission | | | |
| D, D | D, D | No transmission | | | |

Referring to Table 23, N/D may be mapped to negative SR corresponding to the non-occurrence of the scheduling request and A may be mapped to positive SR corresponding to the occurrence of the scheduling request by considering a second bit of CC1 as scheduling request information. Using the above method, a table for 3-bit A/N and the scheduling request may be generated from the 3-bit A/N mapping table. The table may be expressed by Table 24.

TABLE 24

[table for 3-bit A/N and SR]

| CC0 | | transmission channel & transmission symbol | | | |
|---|---|---|---|---|---|
| (CC1) | CC1 (CC0) | CH1 | CH2 | CH3 | CH4 |
| A, A | A, Positive | | −1 | | |
| A, N | A, Positive | | | −j | |
| N, A | A, Positive | | −j | | |
| N, N | A, Positive | | | | −1 |
| A, A | A, Negative | | j | | |
| A, N | A, Negative | | | 1 | |
| N, A | A, Negative | | 1 | | |
| N, N | A, Negative | | | | j |
| A, A | N, Positive | | −1 | | |
| A, N | N, Positive | | | j | |
| N, A | N, Positive | | | | −j |
| N, N | N, Positive | | | | 1 |
| A, A | N, Negative | −1 | | | |
| A, N | N, Negative | j | | | |
| N, A | N, Negative | −j | | | |
| N, N | N, Negative | 1 | | | |
| A, A | D, Negative | −1 | | | |
| A, N | D, Negative | j | | | |
| N, A | D, Negative | −j | | | |
| N, N | D, Negative | 1 | | | |
| A, A | D, Positive | | | −1 | |
| A, N | D, Positive | | | j | |
| N, A | D, Positive | | | | −j |
| N, N | D, Positive | | | | 1 |
| D, D | A, Positive | | | | −1 |
| D, D | A, Negative | | | | j |
| D, D | N, Positive | | | | 1 |
| D, D | N, Negative | No transmission | | | |
| D, D | D, Negative | No transmission | | | |
| D, D | D, Positive | | | | 1 |

The base station may need to monitor whether a terminal makes a scheduling request in a subframe where a scheduling request resource of the terminal is assigned. When the terminal does not transmit ACK/NACK in the subframe where the scheduling request resource is assigned, the base station may determine whether the scheduling request is received by detecting a signal in the corresponding scheduling request resource.

In the Case of 4-Bit ACK/NACK and Scheduling Request:

1. A channel selection mapping table is generated and is transmitted according to a channel selection scheme.

2. Reed-Muller (RM) coding is performed with respect to 5-bit information including 4-bit ACK/NACK and a 1-bit scheduling request and then the RM coded information is transmitted according to a DFT-S-OFDM A/N transmission scheme, which is disclosed in subclauses 1.2.2.4.3 and 1.4.2.1.

3. Bundling is performed with respect to ACK/NACK and then a corresponding result is transmitted to the scheduling request resource, which is disclosed in subclause 1.5.1.

2) Method of Transmitting Reduced ACK/NANCK Information Using a Scheduling Request Resource in Order to Indicate Positive SR:

This method relates to a method of transmitting reduced ACK/NACK information using the scheduling request resource in order to indicate positive SR when positive SR and A/N transmission simultaneously occur. In the case of negative SR, even a subframe where the scheduling request resource is assigned may transmit only ACK/NACK information according to a channel selection scheme. Basically, in the case of positive SR, a number of PDSCHs successfully received may be counted and then be transmitted using the scheduling request resource by indicating the counted number of PDSCHs in a single QPSK transmission symbol. As shown in Table 25, two bit values b(0) and b(1) may be indicated based on the number of PDSCHs that the terminal determines are successfully received, and then may be transmitted. Here, that a PDSCH is successfully received indicates that all the transport blocks included in the PDSCH have passed a cyclic redundancy check (CRC). When even a single transport port block fails in the CRC test, the PDSCH may not be determined to be successfully received.

In this instance, a Rel-8/9 fallback scheme may not be employed for simultaneous transmission of the scheduling request and ACK/NACK. The Rel-8/9 fallback scheme corresponds to a method of transmitting ACK/NACK information using the scheduling request resource in order to indicate positive SR when a downlink resource assignment is present in a downlink PCC. This is because the base station may not discriminate a case where the Rel-8/9 fallback scheme is employed since a PDSCH is unsuccessfully received from the aforementioned case where the counted number of successfully received PDSCHs is transmitted. The Rel-8/9 fallback scheme may be employed for DFT-S-OFDM based ACK/NACK without this problem.

TABLE 25

| Number of successfully received PDSCHs | b(0), b(1) |
|---|---|
| 0 | 0, 0 |
| 1 | 1, 1 |
| 2 | 1, 0 |
| 3 | 0, 1 |
| 4 | 1, 1 |

Hereinafter, ACK/NACK information reduced in another form will be described. Here, it may be assumed that maximum two CCs receive a PDSCH. In the case of negative SR, even the subframe where the scheduling request resource is assigned may transmit only ACK/NACK information according to the channel selection scheme. In the case of positive SR, ACK/NACK bundling may be performed with respect to a codeword transmitted from each CC. In this instance, DTX and NACK may not be discriminated from each other. Specifically, when two codewords are transmitted from a single CC, a case where all of the two codewords are ACK may be indicated as ACK. A case where either of the two codewords is NACK may be indicated as NACK/DTX. b(0) and b(1) may be determined by applying Table 26 to a bundled ACK/NACK state with respect to each of the two CCs.

TABLE 26

| [bundled ACK/NACK state] | |
|---|---|
| Bundled ACK/NACK state of each of CC0 and CC1 | b(0), b(1) |
| NACK/DTX, NACK/DTX | 0, 0 |
| ACK, ACK | 1, 1 |
| ACK, NACK/DTX | 1, 0 |
| NACK/DTX, ACK | 0, 1 |

According to an aspect, a single ACK/NACK channel may be assigned according to assignment of a two-dimensional (2D) sequence. The 2D sequence may include a frequency-domain sequence and a time-domain sequence. The time-domain sequence may include a sequence for the reference signal part and a sequence for the ACK/NACK data part. When N channels are assigned as ACK/NACK resources, N 2D sequences may be assigned. That is, N 2D sequences may be assigned for each slot.

It may be assumed that N 2D sequences belong to the same resource block.

A user equipment (UE) may transmit ACK/NACK according to the following sequence selection.

(1) The UE may select a single 2D sequence from the N 2D sequences.

In this case, the total number of cases that the UE may select is N.

(2) The UE may select a single 2D sequence from the N 2D sequences independently for each slot.

In this case, the total number of cases that the UE may select is N×N.

(3) Independently for each slot, the UE may select a single reference signal sequence from N reference signal sequences and may select a single data sequence from NACK/NACK data sequences.

In this case, the total number of cases that the UE may select is N×N×N×N.

(4) For both slots, the UE may select a single reference signal sequence from N reference signal sequences and may select a single data sequence from N ACK/NACK data sequences.

In this case, the total number of cases that the UE may select is N×N.

In the case of (2), the sequence selection may be performed on a per-slot basis. Specifically, a single sequence may be selected from N sequences in the first slot, and a single sequence may be selected from N sequences in the second slot. According to the above selection, there may be a total of N×N different cases. For example, when N=2, 2×2=4 cases of selection may exist. Accordingly, information corresponding to 2 bits may be transmitted through the sequence selection.

In the case of (3), the sequence selection may be further divided into a sequence selection of the reference signal part and a sequence section of the ACK/NACK data part. Specifically, a single sequence may be selected from N reference signal sequences and a single sequence may be selected from N sequences in the ACK/NACK data part. According to the above scheme, N×N cases may exist for each slot. When two slots are allowed for independent selection, a total of N×N×N×N cases may be possible. For example, when N=2, a total of 2×2×2×2=16 cases may exist. Accordingly, information corresponding to 4 bits may be transmitted through the above sequence selection.

In the case of (4), the sequence selection may be further divided into a sequence selection of the reference signal part and a sequence selection of the ACK/NACK data part. But the sequence selection takes place on a per-subframe (two slots) basis. Specifically, a single sequence may be selected from N reference signal sequences and a single sequence may be selected from N sequences in the ACK/NACK data part. According to the above scheme, N×N cases may exist for each slot. When two slots are allowed for independent selection, a total of N×N cases may be possible. For example, when N=2, a total of 2×2=4 cases may exist. Accordingly, information corresponding to 2 bits may be transmitted through the above sequence selection.

In an LTE system and an LTE-Advanced system, a single downlink grant may transmit two transport blocks. Accordingly, ACK/NACK corresponding to a single grant may include 2 bits. Also, DTX corresponds to a case where an eNode-B (eNB) transmits a grant, however, a UE does not receive the grant. For example, the UE may have five states with respect to the single grant. When the eNB transmits all of N grants to the UE, the UE may have maximum $5^N$ ACK/NACK states. The UE may need to notify the eNB of its ACK/NACK states.

Hereinafter, a method of transmitting ACK/NACK states using the aforementioned sequence selection scheme will be described.

When N=5, the terminal may be able to distinguish maximum $5^5$=3125 ACK/NACK states. When using the sequence selection scheme, a total of $5^4$ cases may exist. When information is transmitted by applying a QPSK modulation to a selected sequence, a total of $5^4 \times 4$=2500 cases may be distinguished by combining the sequence selection scheme and a modulation symbol. Specifically, since the number of states that can be expressed is smaller than $5^5$ states, all of the $5^5$ states, cannot be distinguished. In this case, when two transport blocks are transmitted with respect to a predetermined grant among five grants, it is possible to employ a scheme of not discriminating state (NACK, NACK) from state (DTX, DTX) for the pre-determined grant. In this case, the maximum number of states that can be distinguished by the terminal may be given $5^4 \times 4$ and thus, it is possible to indicate a total of $5^4 \times 4$=2500 cases by combining the sequence selection and the modulation symbol.

When N=4, the terminal may be able to distinguish maximum $5^4$=625 ACK/NACK states. When using the sequence selection scheme, a total of $4^4$ cases may exist. When information is transmitted by applying a QPSK modulation to a selected sequence, a total of $4^4 \times 4$=1024 cases may be indicated by combining a sequence selection and a modulation symbol. Specifically, since that number of states to be expressed is greater than 625, it is possible to transmit ACK/NACK states to the eNB through the sequence selection and the QPSK modulation.

Similarly, when N=3, the terminal may indicate maximum $5^3$=125 ACK/NACK states. When using the sequence selection scheme, a total of $3^4$ cases may exist. When information is transmitted by applying a QPSK modulation to a selected sequence, a total of $3^4 \times 4$=324 cases may be indicated by combining a sequence selection and a modulation symbol. Specifically, since the number of states to be expressed is greater than 125, ACK/NACK states may be transmitted to the eNB through the sequence selection and the QPSK modulation. In this case, even though a BPSK modulation is employed, a total of 162 cases may be indicated and thus, 125 ACK/NACK states may be indicated.

Similarly, when N=2, the terminal may indicate maximum $5^2$=25 ACK/NACK states. When using the sequence selection scheme, a total of 24 cases may exist. When information is transmitted by applying a BPSK modulation or a QPSK modulation to a selected sequence, a total of $2^4 \times 2$=32 or $2^5 \times 2$=64 cases may be indicated by combining a sequence selection and a modulation symbol.

Specifically, since the number of states to be expressed is greater than 25, ACK/NACK states may be transmitted to the eNB through the sequence selection and the BPSK modulation or the QPSK modulation.

When N=1, the terminal may indicate maximum five ACK/NACK states. In this case, using a QPSK modulation, four cases may be indicated and information may be indicated as that a DTX of the terminal does not transmit any signal. Accordingly, maximum five states may be indicated.

The terminal may need to simultaneously transmit ACK/NACK and a scheduling request in a single subframe. The terminal may be assigned in advance with a resource for the scheduling request and may transmit a scheduling request signal using the assigned rescheduling request resource only when the terminal needs to request the base station for the scheduling request. It may be assumed that one of the aforementioned channel or sequence selection schemes is used for ACK/NACK transmission. The base station may need to monitor whether a corresponding terminal makes a scheduling request in a subframe where a scheduling request resource of a predetermined terminal is assigned. When the terminal does not transmit ACK/NACK in the subframe where the scheduling request resource is assigned, the base station may detect a signal in the corresponding scheduling request resource and determine whether the scheduling request is present. When the terminal transmits ACK/NACK in the subframe where the scheduling request resource is assigned, a signal transmitted by the terminal may need to include ACK/NACK and whether of the scheduling request. For this, in the subframe where the scheduling request resource is assigned, a channel or sequence selection may be performed using both an ACK/NACK resource and the scheduling request resource.

In a subframe where the scheduling request resource is not assigned to the terminal, the terminal may perform the channel or sequence selection using PUCCH ACK/NACK channel(s) assigned for ACK/NACK transmission. In the subframe where the scheduling request resource is assigned to the terminal, the terminal may perform the channel or sequence selection using the PUCCH ACK/NACK channel(s) assigned for ACK/NACK transmission and a PUCCH scheduling request resource.

In this instance, when employing a sequence selection scheme of independently selecting a sequence with respect to each of a data portion and a reference signal portion, both a PUCCH ACK/NACK resource and a PUCCH scheduling request resource may need to be present within the same resource block resource. When a reference signal sequence and a data sequence are transmitted in the same resource block, information of a symbol carried in data may be demodulated by performing channel estimation with respect to a data block. For example, when the terminal is assigned with two PUCCH ACK/NACK resources in the subframe where the scheduling request resource is not assigned, the terminal may select a single sequence from two reference signal sequences and also select a single sequence from two data sequences. When a symbol transmitted to a data block is a QPSK, a total of $2 \times 2 \times 4$=16 cases may be indicated, which may correspond to 4-bit information. When the terminal is assigned with two PUCCH ACK/NACK resources in a predetermined subframe for ACK/NACK transmission and a PUCCH scheduling request resource is present in the subframe, three resources may need to be present in the same resource block. The terminal may use all of three resources and thus, may select a single reference signal sequence from three reference signal sequences and then select a single sequence from three data sequences. When a symbol transmitted to a data block is a QPSK, a total of $3 \times 3 \times 4$=36 cases may be indicated using the above method, which may correspond to 5-bit information. Since ACK/NACK uses only four bits, a remaining single bit may indicate whether there is the scheduling request or not.

Figure 4:
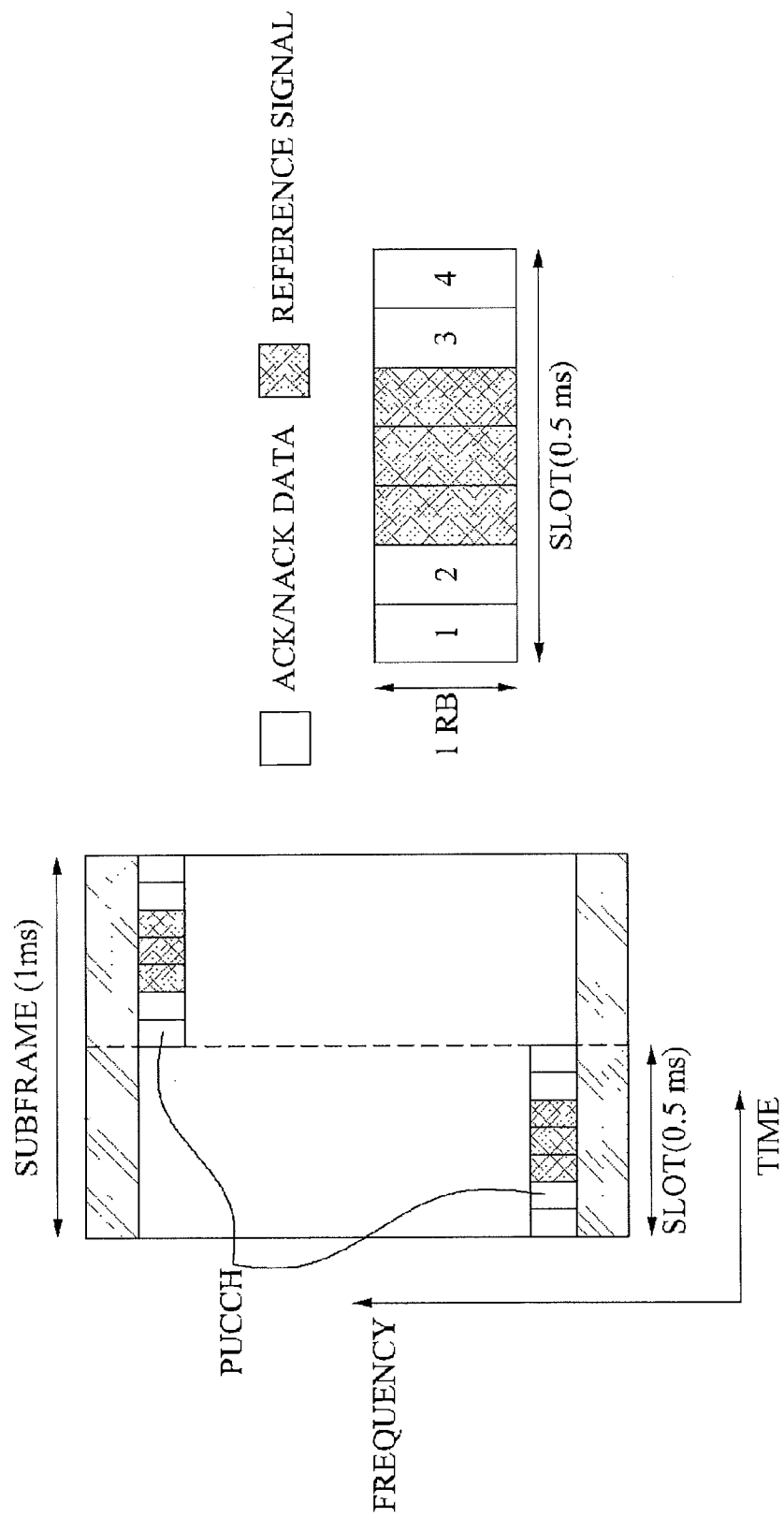
FIG. 4 is a diagram illustrating a channel structure according to an embodiment of the present invention.

FIG. 4 is a diagram illustrating a channel structure according to an embodiment of the present invention.

FIG. 4 illustrates a channel structure when a normal CP is used. Referring to FIG. 4, a plurality of terminals may be code division multiplexed to the same physical resource using a 2D spreading scheme. In this case, spreading may be performed by applying a length-12 sequence in the frequency domain and by applying a length-3 DFT sequence in the time domain. When using the normal CP, ACK/NACK may be spread using a length-4 Walsh sequence.

Figure 5:
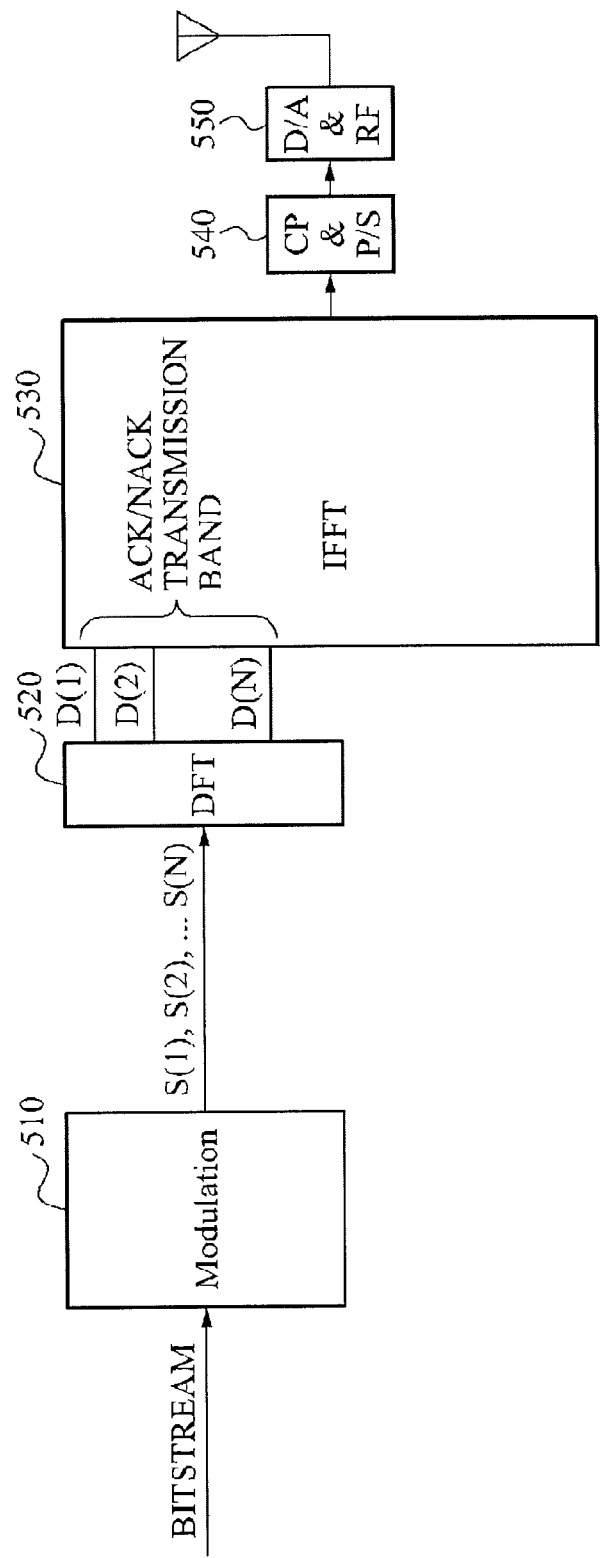
FIG. 5 is a block diagram illustrating a configuration of a terminal according to an embodiment of the present invention.

In the channel structure of FIG. 4, a transmission method of FIG. 5 may be employed to apply a relatively large number of ACK/NACK symbols while maintaining positions of reference signals and ACK/NACK data.

FIG. 5 is a block diagram illustrating a configuration of a terminal according to an embodiment of the present invention.

Referring to FIG. 5, the terminal may include a modulation unit 510, a DFT unit 520, an inverse fast Fourier transform (IFFT) unit 530, and a CP inserter 540, and a radio frequency (RF) unit 550.

The modulation unit 510 may modulate a channel coded bitstream, and the DFT unit 520 may perform DFT on the modulated symbols. The modulated symbols may be mapped to N subcarriers. The N symbols mapped to N subcarriers may be referred to as a symbol block. The IFFT unit 530 may perform IFFT on the symbol block. The CP inserter 540 and the RF unit 550 may transmit inverse fast Fourier transformed symbol blocks.

When a PUSCH uses a normal CP, seven symbol blocks may be transmitted for each slot. Among the seven symbol blocks, the fourth symbol block may be used as a reference signal. When an extended CP is used, six symbol blocks may be transmitted for each slot. Among the six symbol blocks, the third symbol block may be used as a reference signal. A symbol block corresponding to the reference signal may directly map each symbol predefined in each subcarrier in the frequency domain.

In a structure where a single reference signal is transmitted for each slot, when the terminal moves at a relatively high speed, a reception quality may decrease due to deterioration in a channel estimation performance. In the case of a data transmission, a reception success rate may be increased through a Hybrid Automatic Request (HARQ) retransmission by enabling the terminal to retransmit a data block for which a reception error has occurred. However, since retransmission of control information such as ACK/NACK is not allowed, the reception success rate may need to be high for a one-time transmission.

As shown in FIG. 4, to obtain frequency diversity, an ACK/NACK channel may perform slot-level frequency hopping, where a transmission frequency domain may vary on a per-slot basis. Also, the terminal may include a single transmit antenna or a plurality of transmit antennas. When the terminal uses the plurality of transmit antennas, it is assumed that only a single layer is transmitted through precoding.

A first method is to use two reference signals per a single slot as shown in FIG. 6. When two reference signals are used for each slot as shown in FIG. 6, the base station may maintain a channel estimation performance even for a terminal with high speed.

A second method is to multiplex ACK/NACK information from a plurality of terminals into the same radio resource. A reference signal may be spread along the frequency axis using a sequence, and ACK/NACK may be spread along the time axis. To identify information transmitted from different terminals, the reference signals may be assigned with orthogonal frequency-domain sequences and the ACK/NACK data blocks may be assigned with orthogonal time-domain sequences.

A DFT sequence may be used as the orthogonal time-domain sequence to spread the ACK/NACK data block. When a normal CP is used as shown in a part (A) FIG. 6, a length-5 DFT sequence may be used as shown in Table 27.

TABLE 27

[length-5 DFT sequence]

| Sequence index | DFT sequence |
|---|---|
| 0 | [1 1 1 1 1] |
| 1 | [1 $e^{j2\pi/5}$ $e^{j4\pi/5}$ $e^{j6\pi/5}$ $e^{j8\pi/5}$] |
| 2 | [1 $e^{j4\pi/5}$ $e^{j8\pi/5}$ $e^{j12\pi/5}$ $e^{j16\pi/5}$] |
| 3 | [1 $e^{j6\pi/5}$ $e^{j12\pi/5}$ $e^{j18\pi/5}$ $e^{j24\pi/5}$] |
| 4 | [1 $e^{j8\pi/5}$ $e^{j16\pi/5}$ $e^{j24\pi/5}$ $e^{j32\pi/5}$] |

When an extended CP is used as shown in a part (B) of FIG. 6, a length-4 DFT sequence as shown in Table 28 or a length-4 Walsh sequence as shown in Table 29 may be used.

TABLE 28

[length-4 DFT sequence]
Length-4 DFT sequence

| Sequence index | DFT sequence |
|---|---|
| 0 | [1 1 1 1] |
| 1 | [1 $e^{j2\pi/4}$ $e^{j4\pi/4}$ $e^{j6\pi/4}$] |
| 2 | [1 $e^{j4\pi/4}$ $e^{j8\pi/4}$ $e^{j12\pi/4}$] |
| 3 | [1 $e^{j6\pi/4}$ $e^{j12\pi/4}$ $e^{j18\pi/4}$] |

TABLE 29

[length-4 Walsh sequence]
Length-4 Walsh sequence

| Sequence index | Walsh sequence |
|---|---|
| 0 | [1 1 1 1] |
| 1 | [1 −1 1 −1] |
| 2 | [1 1 −1 −1] |
| 3 | [1 −1 −1 1] |

Depending on channel environments of a cell, only a subset of a time-domain sequence may be used. For example, in an environment where terminals rapidly move in the cell, only a sequence with a sequence index (0, 2) or only a sequence with a sequence index (1, 3) in Table 27 may be used.

In the case of the length-4 DFT sequence, only a sequence with a sequence index (0, 2) or only a sequence with a sequence index (1, 3) in Table 28 may be used.

In the case of the length-4 Walsh sequence, a sequence with a sequence index (0, 1), (1, 2), (2, 3), or (3, 1) in Table 29 may be used. This may be desirable to maintain the orthogonality in a high speed environment.

Figure 7:
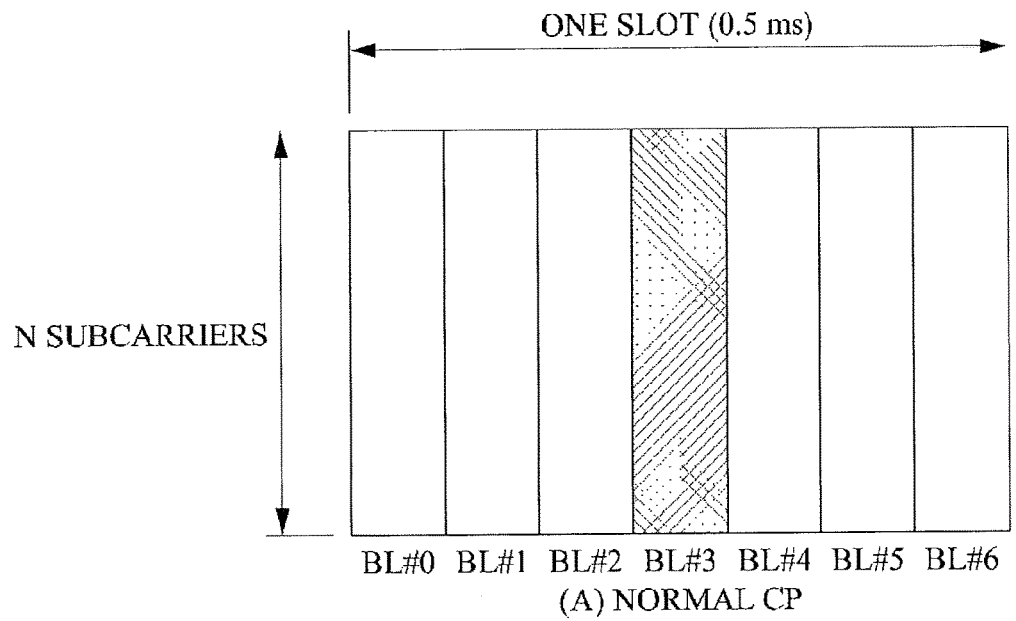
FIG. 7 is a diagram illustrating a channel structure according to still another embodiment of the present invention.
Figure 7:
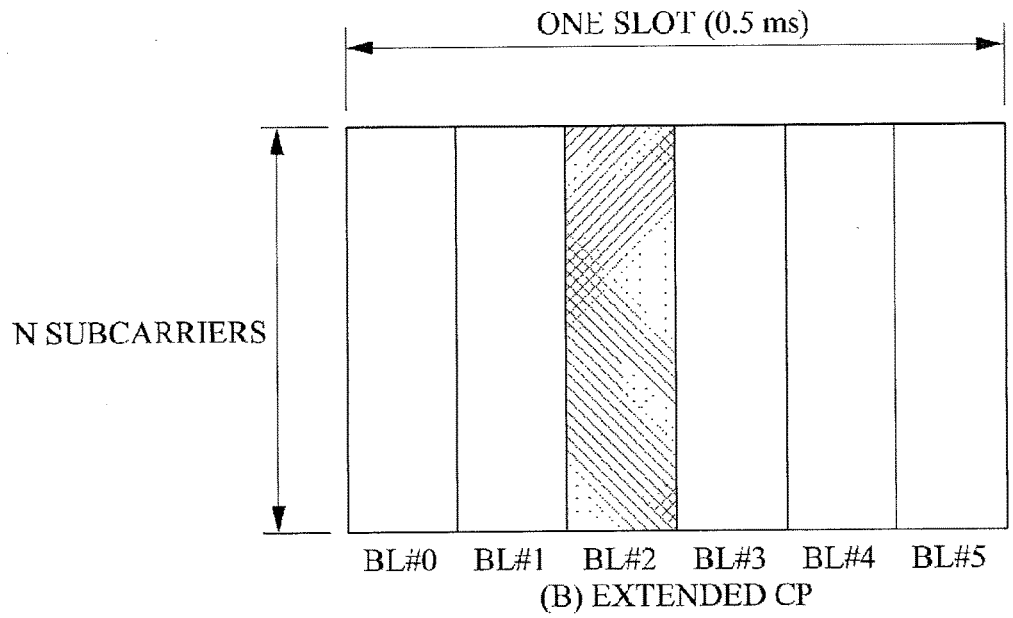

According to an aspect, as shown in a part (A) of FIG. 7, a single symbol block positioned in the center may be used as a reference signal and a sequence with a spreading factor 3 or 6 may be used as a time-domain sequence of the data part.

In the case of the reference signal, it is possible to identify different terminals by assigning orthogonal frequency-domain sequences. The same length of 12 as in an existing PUCCH or a length greater than 12 may be employed as the length of a sequence applied along the frequency axis. Accordingly, when the length of the time-domain sequence is 3 or 6, it is possible to multiplex maximum three or six different terminals into the same resource using the above method.

When the extended CP is used, a sequence with a spreading factor 2 and a sequence with a spreading factor 3 may be used together as a time-domain sequence of the data area or a sequence with a spreading factor 5 may be used as the time-domain sequence of the data area. Referring to a part (B) of FIG. 7, the sequence with the spreading factor 5 may be applied to symbol blocks BL#0, BL#1, BL#3, BL#4, and BL#5. In a structure where the extended CP is used and a single reference signal is used, it may be desirable to locate the reference signal in the symbol block BL#2. When a shortened format is used, the last block of a second slot may not be transmitted. Compared to a case where the reference signal is present in the symbol block BL#3, when the reference signal is present in the symbol block BL#2, the reference signal may be positioned in the middle of ACK/NACK data blocks whereby an accuracy of channel estimation may further increase.

Figure 8:
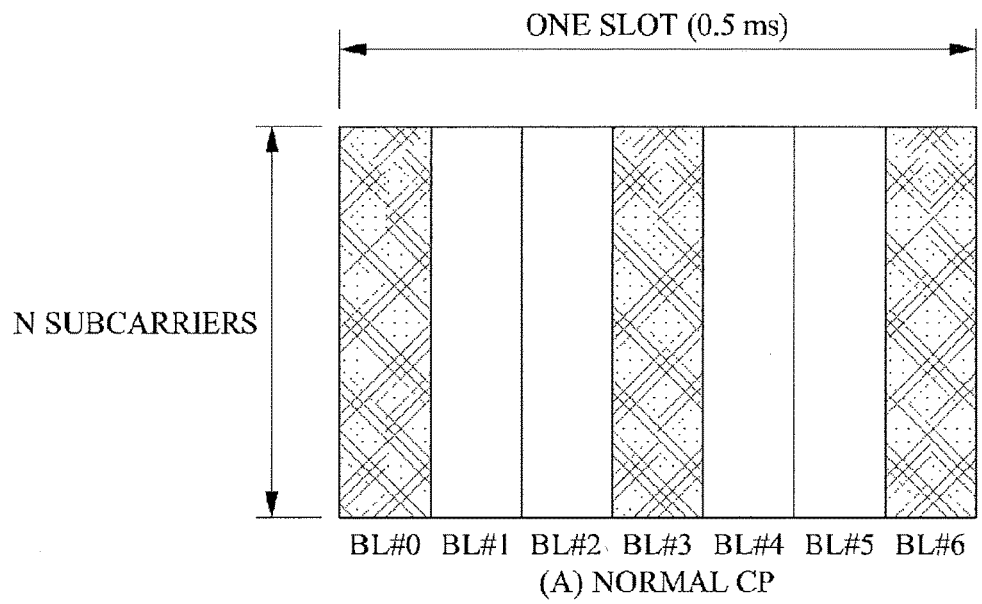
FIG. 8 is a diagram illustrating a channel structure according to yet another embodiment of the present invention.
Figure 8:
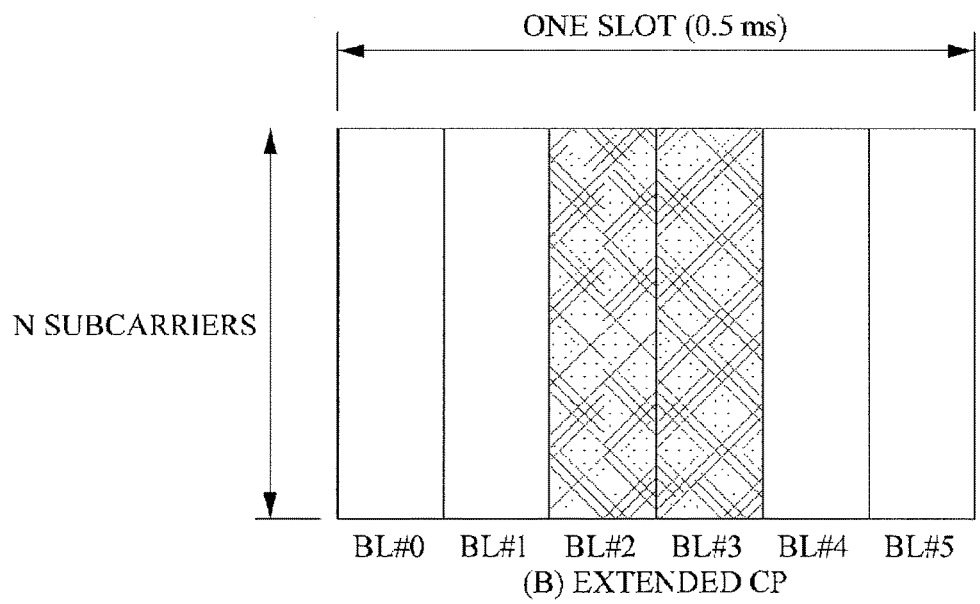

According to an aspect, when a normal CP is used, three symbol blocks may be used as a reference signal as shown in a part (A) of FIG. 8 and a sequence with a spreading factor 2 or 4 may be used as a time-domain sequence of a data area. When the sequence with the spreading factor 2 is used, a length-2 sequence may be applied to symbol blocks BL#1 and BL#2, and BL#4, and BL#5 shown in the part (A) of FIG. 8. When a sequence with a spreading factor 4 is used, a length-4 sequence may be applied to the symbol blocks BL#1, BL#2, BL#4, and BL#5 shown in the part (A) of FIG. 8. In the case of the reference signal, it is possible to identify different terminals by assigning an orthogonal frequency-domain sequence. The same length of 12 as in an existing PUCCH or a length of greater than 12 may be used as a length of a sequence used for a frequency-domain. When the length of the time-domain sequence is 2 or 4, it is possible to multiplex maximum two or four different terminals into the same resource.

When the extended CP is used, a length-2 sequence may be applied to symbol blocks BL#0 and BL#1, and BL#4 and BL#5 as shown in a part (B) of FIG. 8. When a sequence with a length 4 is used, a length-4 sequence may be applied to the symbol blocks BL#0, BL#1, BL#4, and BL#5. Accordingly, when the length of the time-domain sequence is 2 or 4, it is possible to multiplex maximum two or four different terminals into the same resource.

Table 30, Table 31, and Table 32 show examples of a length-2 Walsh sequence, a length-3 DFT sequence, and a length-6 DFT sequence.

TABLE 30

| sequence index | Walsh sequence |
|---|---|
| 0 | [1 1] |
| 1 | [1 −1] |

TABLE 31

| sequence index | DFT sequence |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

TABLE 32

| Sequence index | DFT sequence |
|---|---|
| 0 | [1 1 1 1 1 1] |
| 1 | [1 $e^{j2\pi/6}$ $e^{j4\pi/6}$ $e^{j6\pi/6}$ $e^{j8\pi/6}$ $e^{j10\pi/6}$] |
| 2 | [1 $e^{j4\pi/6}$ $e^{j8\pi/6}$ $e^{j12\pi/6}$ $e^{j16\pi/6}$ $e^{j20\pi/6}$] |

TABLE 32-continued

| Sequence index | DFT sequence |
|---|---|
| 3 | [1 $e^{j6\pi/6}$ $e^{j12\pi/6}$ $e^{j18\pi/6}$ $e^{j24\pi/6}$ $e^{j30\pi/6}$] |
| 4 | [1 $e^{j8\pi/6}$ $e^{j16\pi/6}$ $e^{j24\pi/6}$ $e^{j32\pi/6}$ $e^{j40\pi/6}$] |
| 5 | [1 $e^{j10\pi/6}$ $e^{j20\pi/6}$ $e^{j30\pi/6}$ $e^{j40\pi/6}$ $e^{j50\pi/6}$] |

According to an aspect, when a normal CP is used, three symbol blocks BL#2, BL#3, and BL#4 may be used as a reference signal and a sequence with a spreading factor 2 or 4 may be used as a time-domain sequence of the data area.

For example, when the sequence with the spreading factor 2 is used, a length-2 sequence may be applied to symbol blocks BL#0 and BL#1, and BL#5 and BL#6. When the sequence with the spreading factor 4 is used, a length-4 sequence may be applied to the symbol blocks BL#0, BL#1, BL#5, and BL#6.

In the case of the reference signal, it is possible to identify different terminals by assigning orthogonal frequency-domain sequences. The same length of 12 as in an existing PUCCH or a length greater than 12 may be employed as the length of a sequence applied along the frequency axis. Accordingly, when the length of the time-domain sequence is 2 or 4, it is possible to multiplex maximum two or four different terminals into the same resource.

In a subframe where a sounding reference signal is transmitted, the last block of a second slot of an ACK/NACK channel may not be transmitted. In the structure shown in the part (A) of FIG. 6, the symbol block BL#6 corresponding to the last block of the second slot may not be transmitted. Since the number of ACK/NACK data blocks reduces from five to four, the number of terminals capable of performing transmission using the same radio resource block while maintaining orthogonal transmission may also reduce from five to four. In the case of the reference signal block, no change may be made in the sequence while in the case of an ACK/NACK data block, a change may be made only in the second slot. Specifically, orthogonal time-domain sequences being applied to the ACK/NACK data block of the second slot may use the length-4 DFT sequences of Table 33 or the length-4 Walsh sequences of Table 34.

TABLE 33

| Sequence index | DFT sequence |
|---|---|
| 0 | [1 1 1 1] |
| 1 | [1 $e^{j2\pi/4}$ $e^{j4\pi/4}$ $e^{j6\pi/4}$] |
| 2 | [1 $e^{j4\pi/4}$ $e^{j8\pi/4}$ $e^{j12\pi/4}$] |
| 3 | [1 $e^{j6\pi/4}$ $e^{j12\pi/4}$ $e^{j18\pi/4}$] |

TABLE 34

| Sequence index | Walsh sequence |
|---|---|
| 0 | [1 1 1 1] |
| 1 | [1 −1 1 −1] |
| 2 | [1 1 −1 −1] |
| 3 | [1 −1 −1 1] |

Hereinafter, a method of randomizing intra-cell interference and inter-cell interference when using the aforementioned DFT-S-OFDM based ACKJNACK transmission method will be described.

It may be assumed that cyclic shifted versions of a Constant Amplitude Zero Auto-Correlation (CAZAC)

sequence are used as frequency-domain sequences as in the PUCCH of the LTE Release 8.

1) Intra-Cell Interference Randomization:

It is possible to randomize interference between terminals transmitting ACK/NACK using the same resource in a cell by applying a different cyclic shift and a different time-domain sequence used for reference signal blocks and ACK/NACK data blocks in the two slots. According to an aspect, a cyclic shift used for reference signal blocks may be differently set in the first slot and the second slot. Specifically, the cyclic shift may be remapped in the second slot. A time-domain sequence used for ACK/NACK data blocks may be differently set in the first slot and the second slot. Specifically, the time-domain sequence may be remapped in the second slot.

Specifically, in the structure shown in the part (A) of FIG. 6, interference of the time-domain sequence may be randomized with respect to ACK/NACK data blocks as follows.

As described above, in the structure shown in the part (A) FIG. 6, the time-domain sequence with the length of 5 used for the symbol blocks BL#0, BL#2, BL#3, BL#4, and BL#6 may use a DFT sequence of Table 35.

TABLE 35

| Sequence index | DFT sequence |
|---|---|
| 0 | [1 1 1 1 1] |
| 1 | [1 $e^{j2\pi/5}$ $e^{j4\pi/5}$ $e^{j6\pi/5}$ $e^{j8\pi/5}$] |
| 2 | [1 $e^{j4\pi/5}$ $e^{j8\pi/5}$ $e^{j12\pi/5}$ $e^{j16\pi/5}$] |
| 3 | [1 $e^{j6\pi/5}$ $e^{j12\pi/5}$ $e^{j18\pi/5}$ $e^{j24\pi/5}$] |
| 4 | [1 $e^{j8\pi/5}$ $e^{j16\pi/5}$ $e^{j24\pi/5}$ $e^{j32\pi/5}$] |

In Table 35, a single DFT sequence may be indicated as $O_i=[D_i(0), D_i(1), D_i(2), D_i(3), D_i(4)]$ where i denotes the sequence index. Slot-level remapping enables a DFT sequence used in the first slot and a DFT sequence used in the second slot to be different from each other. Accordingly, when $Q_i$ is used in the first slot, $Q_j$ may be used in the second slot. Here, j≠i or j=i.

To normalize interference experienced by terminals, remapping may be performed by considering the following elements. Initially, when using the DFT sequence disclosed in Table 35, an aspect that the orthogonality may be further maintained as sequence indices are further separate from each other may be considered. For example, referring to Table 35, an amount of the average interference between $O_0$ and $O_2$ may be less than an amount of the average interference between $O_0$ and $O_1$. Accordingly, when two terminals use neighboring sequences in the first slot, the two terminals may use non-neighboring sequences in the second slot.

In constrast, when the two terminals use non-neighboring sequences in the first slot, the two terminals may use neighboring sequences in the second slot. The above method may be easily performed by determining a DFT sequence assignment order in the second slot so that an index difference may become 2, for example, {0, 2, 4, 1, 3}. Table 36 shows an example of effective remapping of the time-domain sequence

TABLE 36

| Terminal | DFT sequence in first slot | (Example 1) DFT sequence in second slot | (Example 2) DFT sequence in second slot |
|---|---|---|---|
| UE0 | $O_0$ | $O_0$ | $O_0$ |
| UE1 | $O_1$ | $O_2$ | $O_3$ |

TABLE 36-continued

| Terminal | DFT sequence in first slot | (Example 1) DFT sequence in second slot | (Example 2) DFT sequence in second slot |
|---|---|---|---|
| UE2 | $O_2$ | $O_4$ | $O_1$ |
| UE3 | $O_3$ | $O_1$ | $O_4$ |
| UE4 | $O_4$ | $O_3$ | $O_2$ |

For example, a terminal UE 1 may use $O_1$ in the first slot and be remapped in the second slot to thereby use $O_2$ in example 1 of Table 36. The terminal UE1 may receive a largest amount of interference from UE0 and UE2 using neighboring sequence indices in the first slot, and may receive a largest amount of interference from UE3 and UE4 using neighboring sequence indices in the second slot. Most interfering terminals may be diversified over the first slot and the second slot and thereby an amount of interference between the terminals may be normalized. In Table 36, four sequence assignments {2, 4, 1, 3, 0}, {4, 1, 3, 0, 2}, {1, 3, 0, 2, 4}, and {3, 0, 2, 3, 1} corresponding to a cyclic rotation of {0, 2, 4, 1, 3} of Example 1 may have the same effect. Like {0, 3, 1, 4, 2} of example 2 of Table 36, sequence indices may be configured to cyclically decrease. Also in this case, four sequence assignments {3, 1, 4, 2, 0}, {1, 4, 2, 0, 3}, {4, 2, 0, 3, 1}, and {2; 0, 3, 1, 4} corresponding to a cyclic rotation of {0, 3, 1, 4, 2} may also have the same effect. Specifically, the same effect may be achieved only if a sequence index difference is configured to become 2.

When a shortened format is used in the second slot in the structure shown in the part (A) of FIG. 6, the slot-level remapping may achieve the average normalization by appropriately selecting a length-5 DFT sequence used in the first slot and a length-4 sequence used in the second slot.

When a single DFT sequence of Table 35 is indicated as $P_i=[D_i(0), D_i(1), D_i(2), D_i(3)]$ where i denotes a sequence index, and this DFT sequence is used in the second slot, and when two terminals use neighboring sequences in the first slot, the terminals may be configured to use non-neighboring sequences in the second slot if possible. Conversely, when the two terminals use non-neighboring sequences in the first slot, the two terminals may be configured to use neighboring sequences in the second slot. Through this, the interference normalization may be achieved. When four sequences $O_0$, $O_1$, $O_2$, and $O_3$ among five sequences are used for the assignment in the first slot, $P_i$ may be assigned in the second slot as shown in example 1 of Table 37. Here, i denotes a sequence index of Table 35.

TABLE 37

| Terminal | DFT sequence in first slot | (Example 1) DFT sequence in second slot | (Example 2) Walsh sequence in second slot |
|---|---|---|---|
| UE0 | $O_0$ | $P_0$ | $W_0$ |
| UE1 | $O_1$ | $P_2$ | $W_1$ |
| UE2 | $O_2$ | $P_1$ | $W_2$ |
| UE3 | $O_3$ | $P_3$ | $W_3$ |

It may be assumed that a single Walsh sequence is indicated as $W_i=[D_i(0), D_i(1), D_i(2), D_i(3)]$ where i denotes a sequence index and this Walsh sequence is used in the second slot. Referring to the Walsh sequence of Table 34, an amount of interference between sequences using neighboring indices may be less than an amount of interference between sequences using non-neighboring indices. Accordingly, when two terminals use neighboring DFT sequences in the first slot, the two terminals may be configured to use neighboring Walsh sequences in the second slot. When the two terminals use non-neighboring DFT sequences in the first slot, the two terminals may be configured to use non-neighboring Walsh sequences in the second slot. Through this, the interference normalization may be achieved. When four sequences $O_0$, $O_1$, $O_2$, and $O_3$ among five sequences are used for the assignment in the first slot, $W_i$ may be assigned in the second slot as shown in example 2 of Table 37. Here, i denotes a sequence index of Table 32.

To further randomize interference in each terminal, a time-domain sequence to be assigned to each terminal may be differently assigned for each subframe. According to the LTE Rel-8/9 standard, a single radio frame includes a total of ten consecutive subframes. Here, a single radio frame lasts for 10 ms and a single subframe lasts for 1 ms. For example, when an assignment relationship of Table 37 is used for a single subframe, time-domain sequences to be assigned to a terminal may vary in another subframe as shown in Table 38.

TABLE 38

| Terminal | DFT sequence in first slot | (Example 1) DFT sequence in second slot | (Example 2) DFT sequence in second slot |
|---|---|---|---|
| UE1 | $O_0$ | $O_0$ | $O_0$ |
| UE4 | $O_1$ | $O_2$ | $O_3$ |
| UE0 | $O_2$ | $O_4$ | $O_1$ |
| UE2 | $O_3$ | $O_1$ | $O_4$ |
| UE3 | $O_4$ | $O_3$ | $O_2$ |

In Table 36 and Table 38, a sequence assignment of a terminal may be expressed by a leftmost terminal index column. For example, the sequence assignment of the terminal may be indicated as {UE0, UE1, UE2, UE3, UE4} in Table 36, and may be indicated as {UE1, UE4, UE0, UE2, UE3} in Table 38. A total of 5! (=120) different sequence assignments may exist. Accordingly, each of maximum 120 consecutive terminal sequence assignments may be different in each subframe. When a sequence assignment is desired to repeat based on a single frame unit, ten out of 120 assignments may be selected and thereby be used. Ten sequences used for each cell may be selected to be different from each other.

2) Inter-Cell Interference Randomization:

Block-level cyclic shift hopping may be applied to a cyclic shift used for reference signal blocks. The block-level cyclic shift hopping may indicate changing a cyclic shift based on a block unit. In the case of an LTE Release 8, a reference signal used for a PUCCH may perform the above cyclic shift hopping. A hopping pattern of the cyclic shift may be generated by applying an offset to the cyclic shift. In this instance, a hopping pattern of the offset may be the same in each cell. For example, when terminals performing ACK/NACK transmission using the same resource in a single cell have the same hopping pattern, the orthogonality between the terminals may be maintained. In particularly, when the hopping pattern is set to be different between neighboring cells, hopping patterns of terminals between cells may be different from each other and thus, interference may be randomized.

Block-level scrambling may be applied with respect to a time-domain sequence used for ACK/NACK data blocks. In this case, the same scrambling sequence may be used in a cell. For example, terminals performing ACK/NACK transmission using the same resource in a cell may have the same scrambling sequence so that the orthogonality between the terminals is maintained. Also, terminals belonging to different cells may have different scrambling sequences and thus, interference may be randomized.

Figure 12:
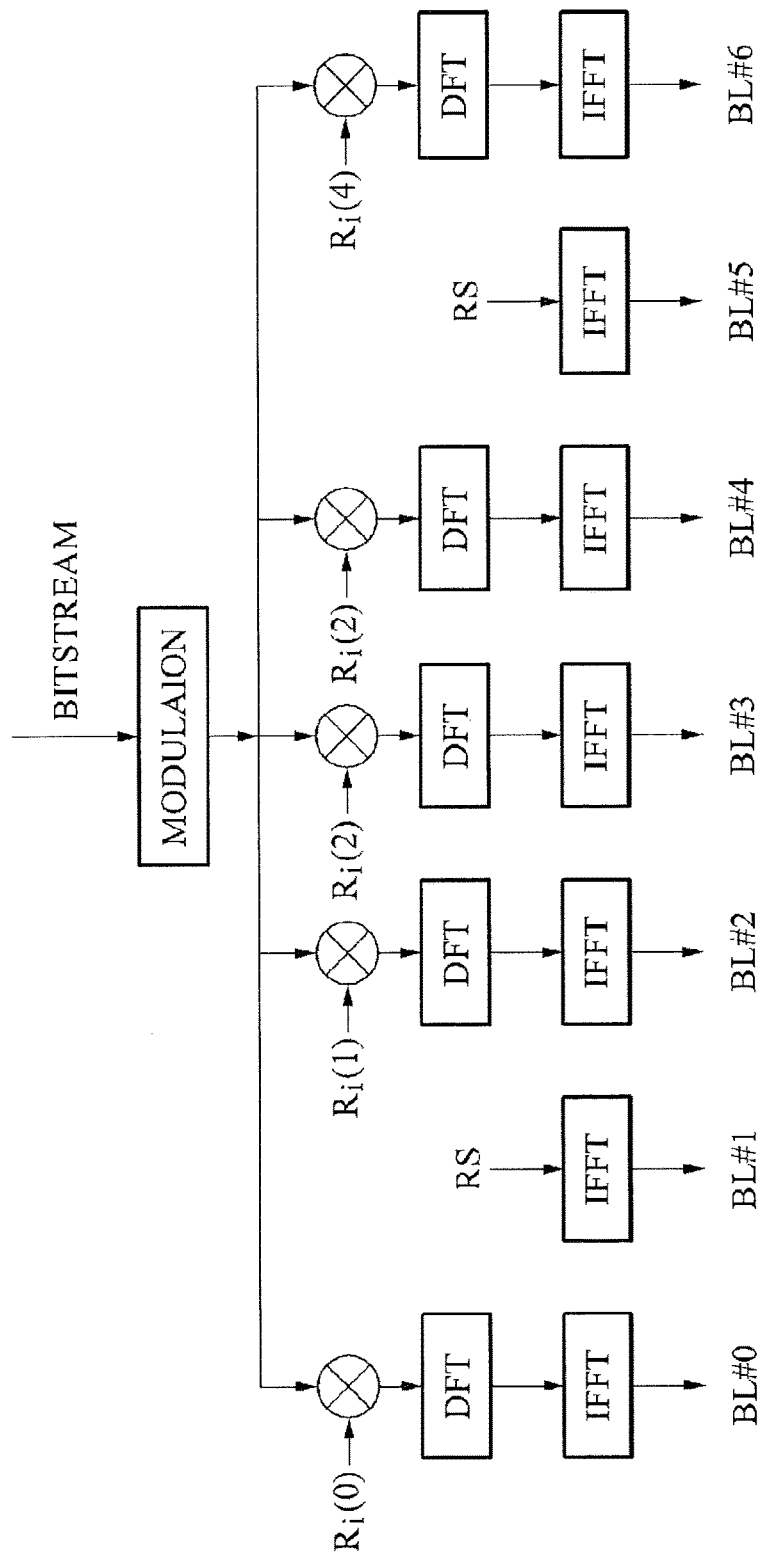
FIG. 12 through FIG. 14 are diagrams illustrating an example of a discrete Fourier transform (DFT)-S-orthogonal frequency division multiplexing (OFDM) based transmission.

As described above, in the structure shown in the part (A) of FIG. 6, the orthogonal time-domain sequence with the length of 5 used for the symbol blocks BL#0, BL#2, BL#3, BL#4, and BL#6 may use the DFT sequence of Table 35. A single DFT sequence of Table 35 may be denoted as $O_i = [D_i(0), D_i(1), D_i(2), D_i(3), D_i(4)]$. Here, i denotes a sequence index. A scrambling sequence to be used together with the DFT sequence $O_i$ may be denoted as $Q = [S(0), S(1), S(2), S(3), S(4)]$. An element constituting the scrambling sequence may be provided in a form of $S(i) = \exp(j\theta_i)$. By multiplying element-wise the DFT sequence $O_i$ and the scrambling sequence Q element level, a sequence $R_i$ is obtained; $R_i = [R_i(0), R_i(1), R_i(2), R_i(3), R_i(4)] = [D_i(0)S(0), D_i(1)S(1), D_i(2)S(2), D_i(3)S(3), D_i(4)S(4)]$. After multiplying data symbols by the corresponding elements of $R_i$, DFT may be performed. The above relationship may be expressed as shown in FIG. 12. Terminals transmitting ACK/NACK using the same radio resource block in a cell may use different DFT sequences but use the same scrambling sequence in order to maintain mutual orthogonality. Also terminals served by different cells may use different scrambling sequences, which thus can achieve the inter-cell interference randomization.

In the structure shown in the part (A) of FIG. 6, when the shortened format is used in the second slot, the length-4 DFT sequence of Table 33 or the length-4 Walsh sequence of Table 34 may be used as the orthogonal time-domain sequence to be used for ACK/NACK data blocks in the second slot. A single time-domain orthogonal sequence may be indicated as $U_i = [D_i(0), D_i(1), D_i(2), D_i(3)]$. Here, i denotes a sequence index of Table 33 or Table 34. A scrambling sequence to be used together with the orthogonal sequence $U_i$ may be used as $Q = [S(0), S(1), S(2), S(3)]$. DFT may be performed by multiplying data symbols by corresponding elements of sequence $R_i = [R_i(0), R_i(1), R_i(2), R_i(3)] = [D_i(0)S(0), D_i(1)S(1), D_i(2)S(2), D_i(3)S(3)]$. Here, Ri may be obtained by multiplying element-wise the time-domain orthogonal sequence $U_i$ and the scrambling sequence Q. Using the aforementioned method, the first slot may be processed as shown in FIG. 12 and the second slot may be processed as shown in FIG. 13.

Hereinafter, a form of the scrambling sequence $Q = [S(0), S(1), S(2), S(3), S(4)]$ or $Q = [S(0), S(1), S(2), S(3)]$ will be described. In general, taking $S(i) = \exp(j2\pi n_i/N)$ may be convenient for implementation. Specifically, phase modulation may be used to form phases with regular angular intervals on the complex plane. Here, N denotes an integer and $n_i$ denotes an integer satisfying $0 \leq n_i < N$. $n_i$ may be obtained by generating a pseudo-random sequence and sequentially substituting corresponding values of the pseudo-random sequence. Accordingly, $n_i$ may have a different value depending on the slot number and the DFT-S-OFDM symbol number. The repetition period, after which the same values repeat, may be configured to be at least one frame. When the repetition period is set to be a single frame, a generator of the pseudo-random sequence may be initialized at a start point in time of each frame. Here, terminals to be code division multiplexed using the same resource in the same cell may need to use the same pseudo-random sequence in order to maintain orthogonality. On the other hand, when the pseudo-random sequences are different for different cells, interference between neighboring cells may be randomized. For this, by including cell identity (ID) as a parameter for initialization of the pseudo-random sequence, it is possible to generate and use a different pseudo-random sequence for a different cell ID.

Figure 13:
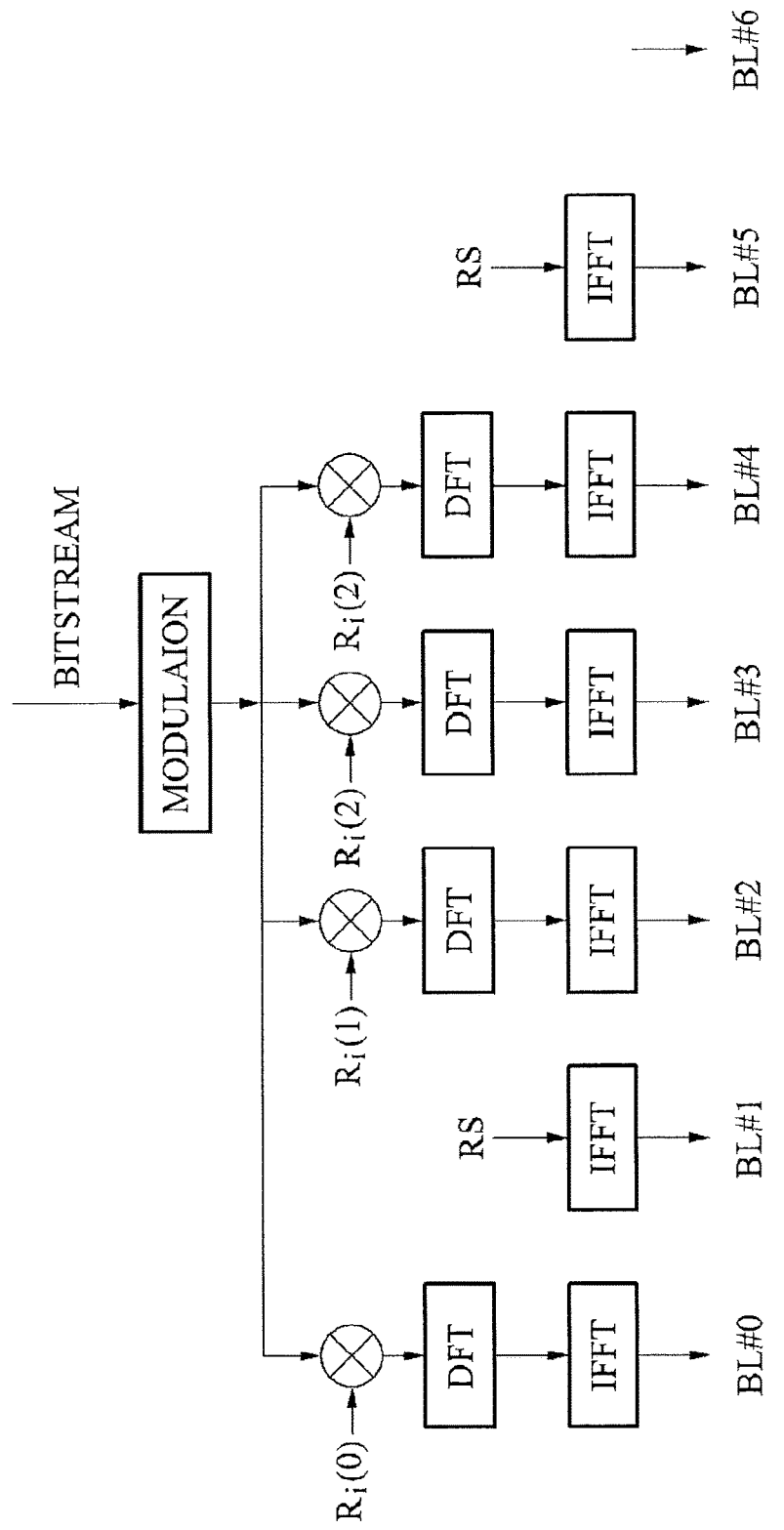
Figure 14:
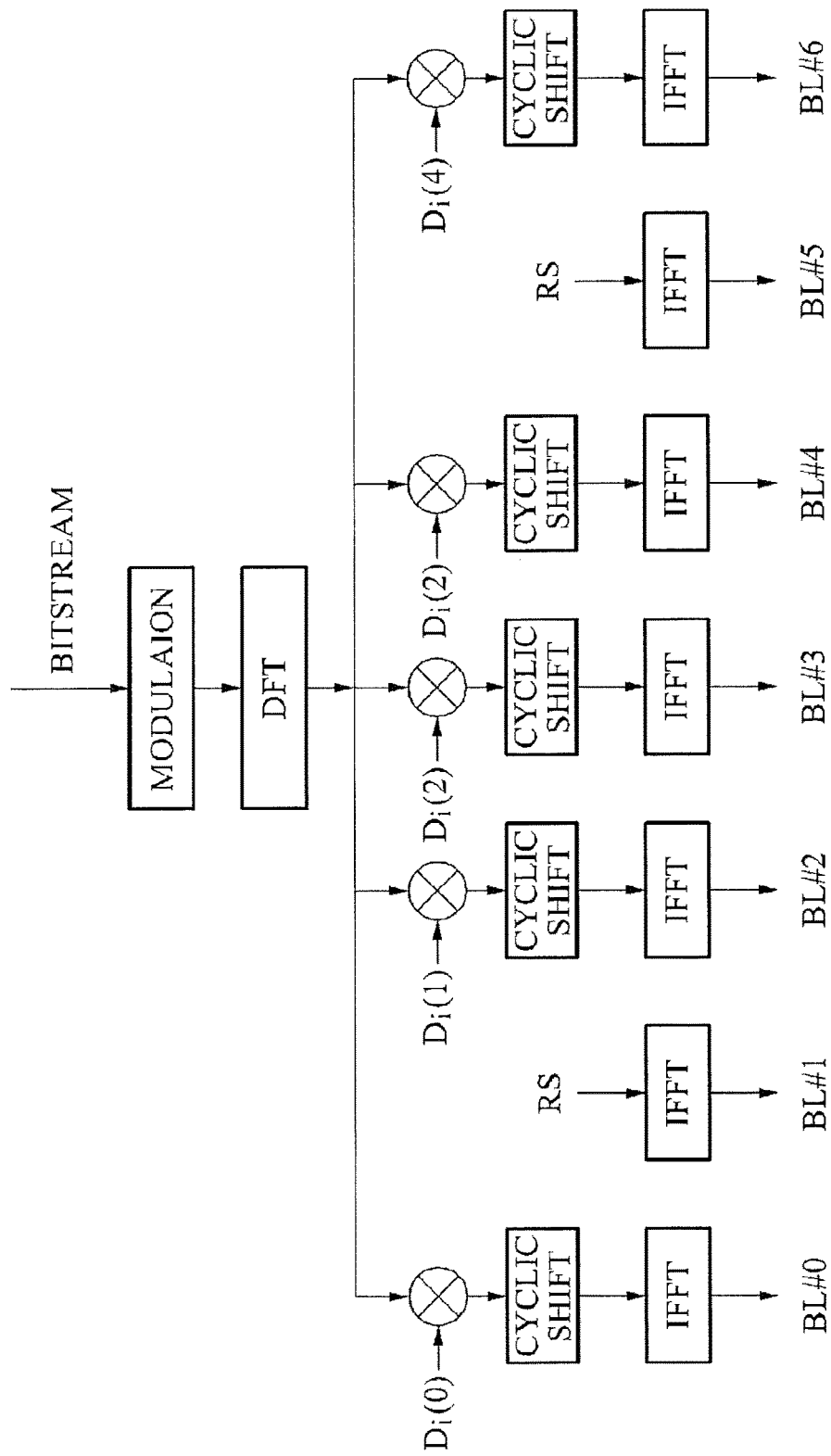

For reference, in FIGS. 12, 13, and 14, sequences of a multiplication of a sequence element [$R_i(n)$ or $D_i(n)$] and a DFT operation may be switched with each other. That is, in both a case where the DFT operation is performed in each figure and then the multiplication of the sequence element [$R_i(n)$ or $D_i(n)$] is performed, and a case where the multiplication of the sequence element [$R_i(n)$ or $D_i(n)$] is performed and then the DFT operation is performed, the same results may be obtained.

According to an aspect, prior to the DFT operation instead of S(i), $S_k(i)=\exp(j2\pi n_i k/N)$ (k=0, 1, 2, . . . 11) may be sequentially multiplied with respect to 12 complex symbols. When N=12, a portion of multiplying $S_k(i)$ prior to the DFT operation may be replaced with a cyclic shift in a frequency domain after the DFT operation. This is because the DFT operation has the following property.

$$DFT[\exp(j2\pi n_i k/12)F(k)](k)=DFT[F(k)](k-n_i)$$

Specifically, when DFT with a magnitude of 12 is performed by employing $\exp(j2\pi n_i k/N)F(k)$ (k=0, 1, 2, . . . 11) as an input instead of F=[F(0), F(1), . . . F(11)] with a length of 12, the corresponding result may become the same as the result obtained by performing $n_i$ cyclic shift of the result obtained by performing the DFT operation with respect to F. Accordingly, when employing the above property, the terminal may perform cyclic shift as many as $n_i$ with respect to the result obtained by performing the DFT operation with respect to each ACK/NACK data block as shown in FIG. 14, instead of multiplying $S_k(i)$ prior to the DFT operation as shown in FIG. 12. As described above, the above two processes may produce exactly the same result.

Figure 9:
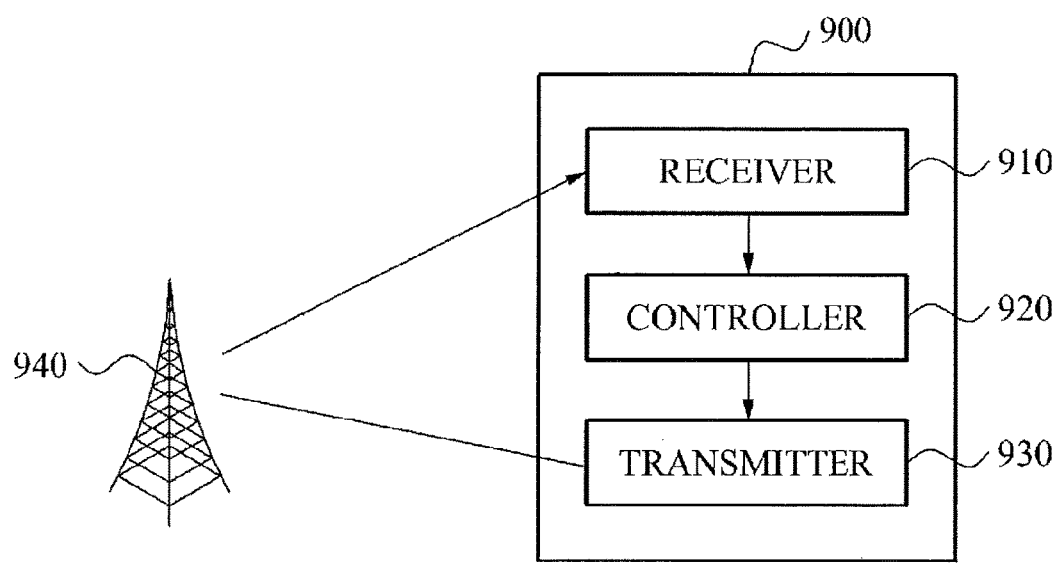
FIG. 9 is a block diagram illustrating a configuration of a terminal according to another embodiment of the present invention.

FIG. 9 is a block diagram illustrating a configuration of a terminal 900 according to another embodiment of the present invention.

Referring to FIG. 9, the terminal 900 may include a receiver 910, a controller 920, and a transmitter 930.

The receiver 910 may receive control information and data using a plurality of downlink CCs.

The controller 920 may determine an uplink channel element included in an uplink CC, based on an index of a channel element used to transmit the control information among a plurality of downlink channel elements included in a downlink CC.

The transmitter 930 may transmit, to a base station 940, ACK/NACK with respect to the data using the determined uplink channel element.

Scheduling information associated with the data in the control information may be transmitted using a PCC among the plurality of downlink CCs. In this case, the receiver 910 may receive the scheduling information using the PCC among the plurality of downlink CCs. The controller 920 may determine an uplink channel element in an uplink CC corresponding to the PCC.

The receiver 910 may receive correspondence relationship between the plurality of downlink CCs and the plurality of uplink CCs. The receiver 910 may receive the correspondence relationship using RRC signaling.

Scheduling information associated with the data may be distributed to each of the downlink CCs and thereby be transmitted. In this case, the receiver 910 may receive the scheduling information using all of the downlink CCs. Scheduling information transmitted using a predetermined downlink CC may relate to data transmitted the corresponding downlink CC.

Even in this case, ACK/NACK associated with data transmitted using each downlink CC may be transmitted using a predetermined single uplink CC.

When ACK/NACK associated with data transmitted using the plurality of downlink CCs is transmitted using the single uplink CC, the uplink CC may need to additionally assign a radio resource.

According to an aspect, in this case, the controller 920 may determine an additional uplink channel element using a downlink channel element having a second lowest index among downlink channel elements used to transmit control information. The transmitter 930 may transmit the ACK/NACK using the determined uplink channel element.

The receiver 910 may receive RRC signaling from the base station 940. The RRC signaling may include information associated with a predetermined uplink channel element. In this case, the controller 920 may determine an additional uplink channel element based on information associated with the predetermined uplink channel element included in the RRC signaling, in order to transmit the ACK/NACK.

According to another embodiment of the present invention, the terminal 900 may effectively control a power of an uplink control channel.

The receiver 910 may receive data from the base station 940. The controller 920 may generate ACK/NACK associated with the received data. The transmitter 930 may transmit, to the base station 940, a data packet including the ACK/NACK and a scheduling request for the base station 940.

In this case, the transmitter 930 may determine a transmit power of the data packet based on a number of bits of the ACK/NACK and a number of bits of the scheduling request that are included in the data packet.

The transmitter 930 may determine the transmit power of the data packet according to Equation 1:

$$P_{PUCCH}(i)=\min\{P_{CMAX}, P_{0\_PUCCH}+PL+h(n_{HARQ}, n_{SR})+\Delta_{F\_PUCCH}(F)g(i)\} \quad \text{[Equation 1]}$$

In Equation 1, $P_{CMAX}$ denotes a maximum transmit power that is a configured UE transmitted power of the transmitter 930, and $P_{0\_PUCCH}$ is given as a sum of a cell unique parameter $P_{O\_NOMINAL\_PUCCH}$ and a UE unique parameter $P_{O\_UE\_PUCCH}$. $P_{O\_NOMINAL\_PUCCH}$ and $P_{O\_UE\_PUCCH}$ correspond to parameters provided from an upper layer. PL denotes an estimate value of a downlink pathloss from the base station 940 to the terminal 900. $\Delta_{F\_PUCCH}(F)$ may be provided from the upper layer as a value corresponding to a PUCCH format F transmitting the scheduling request for the base station 940, and denotes a relative value with respect to a PUCCH format 1a. g(i) corresponds to a value adjusted by a Transmit Power Control (TPC) command and denotes a current PUCCH power control adjustment state.

Here, $h(n_{HARQ}, n_{SR})$ may be determined according to Equation 2:

$$h(n_{HARQ}, n_{SR}) = 10\log_{10}\left(\frac{n_{HARQ} + n_{SR}}{\beta}\right) \quad \text{[Equation 2]}$$

In Equation 2, $\beta$ denotes a proportional constant and $\beta=1$. In addition, $n_{HARQ}$ denotes the number of bits of the ACK/NACK, and $n_{SR}$ denotes the number of bits of the scheduling request.

As one example of $\beta$ as the proportional constant, $\beta=1$ may be used.

Hereinafter, a method proposed in the present invention in order to set $n_{HARQ}$ will be described.

It may be assumed that a number of downlink configured CCs of a predetermined UE is L, a number of activated CCs among the downlink configured CCs is M, and a number of downlink CCs used to transmit downlink data to the UE based on the determination of the UE is N. For example, even though an eNB transmits data to the UE using three downlink CCs, the UE may not appropriately detect a portion of downlink assignment information and thus, may determine that the UE has received the data using only two downlink CCs. In this case, N indicates 2.

In a subframe where a scheduling request resource is assigned, when ACK/NACK and scheduling request information are simultaneously transmitted using PUCCH format 3, $n_{SR}=1$. In a subframe where the scheduling request resource is not assigned, $n_{SR}=0$.

Here, it may be assumed that a number of bits of ACK/NACK to be fed back from the UE to the eNB with respect to data received using N downlink CCs is K. When all of the ACK/NACK is indicated and thereby is transmitted, K may match a total number of transport blocks received at the terminal. However, when bundling is applied with respect to a portion of or all of ACK/NACK, K may be less than a total number of transport blocks received at the terminal.

When K=0, the transmission itself may not be performed.

Method 1 for Setting $n_{HARQ}$ $n_{HARQ}$ may be set as follows:

$n_{HARQ}=K$

From information obtained by receiving PDCCHs, the terminal may be aware of a number of transport blocks transmitted to the terminal. In the case of semi-persistent scheduling (SPS), only a downlink PDSCH transmission may be present without a PDCCH transmission from the base station. Accordingly, a total number of transport blocks may need to be calculated by considering the above case. However, the terminal may fail in successfully receiving a PDCCH transmitted from the base station. In this case, the terminal may transmit information using a smaller amount of power than an appropriate amount of power. Accordingly, the base station may not successfully detect information. To complement the above problem, the following method may be considered.

METHOD 2 FOR SETTING $n_{HARQ}$

It may be assumed that downlink CCs that correspond to activated CCs, however, do not have downlink data transmission are c(1), c(2), L, c(M−N), and a maximum number of ACK/NACK bits probable based on a transmission mode set in a CC c(i) is $Q_{c(i)}$. The proposed method may set $n_{HARQ}$ as follows:

$$n_{HARQ} = K + \sum_{i=1}^{M-N} Q_{c(i)}$$

Even though the terminal determines that data transmission is absent in an activated CC, a maximum number of ACK/NACK bits transmittable in a corresponding CC may be included in a payload and thereby be calculated. The terminal may fail in receiving a PDCCH and thus, an amount of power may be set for preparation thereto.

Method 3 for Setting $n_{HARQ}$

It may be assumed that a maximum number of transport blocks transmittable using each downlink CC is α. In a 3GPP LTE Technical Specification Release 10, maximum two transport blocks may be transmitted using each downlink CC. Accordingly, in this case, a indicates 2. The proposed method may set $n_{HARQ}$ as follows:

$n_{HARQ}=K+\alpha(M-N)$

Method 4 for Setting $n_{HARQ}$

It may be assumed that downlink CCs that correspond to downlink configured CCs, however, do not have downlink data transmission are d(1), d(2), L, d(L−N), and a maximum number of ACK/NACK bits probable based on a transmission mode set in a CC d(i) is $Q_{d(i)}$. The proposed method may set $n_{HARQ}$ as follows:

$$n_{HARQ} = K + \sum_{i=1}^{L-N} Q_{d(i)}$$

Method 5 for Setting $n_{HARQ}$

The proposed method may set $n_{HARQ}$ as follows:

$N_{Harq}=K+\alpha(L-N)$

Figure 10:
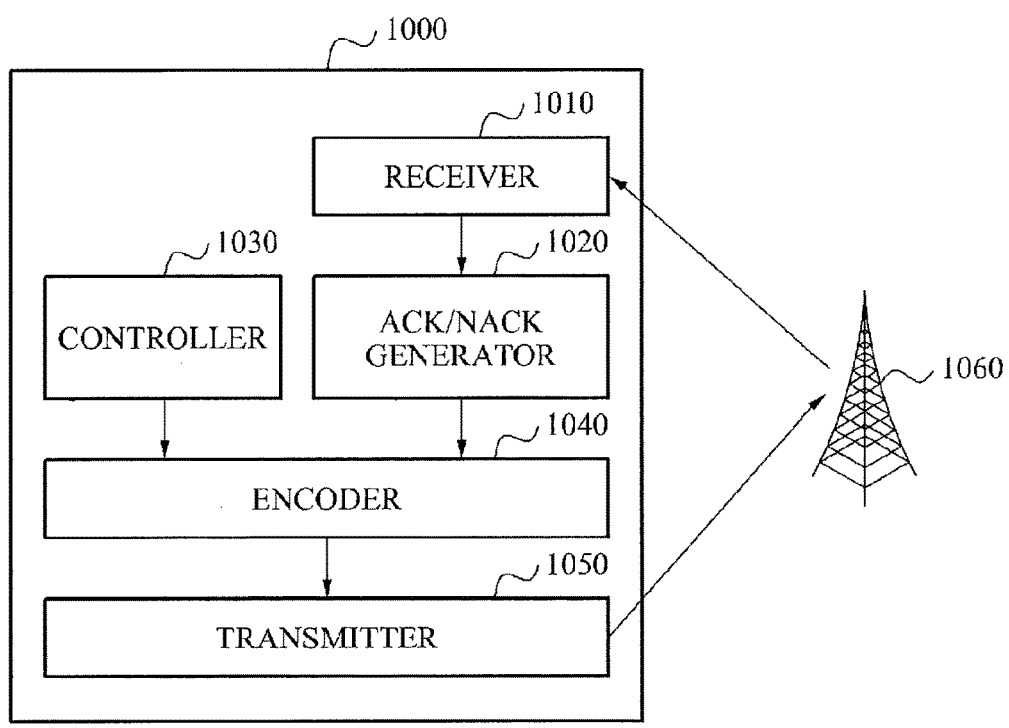
FIG. 10 a block diagram illustrating a configuration of a terminal according to still another embodiment of the present invention.

FIG. 10 is a block diagram illustrating a configuration of a terminal 1000 according to still another embodiment of the present invention.

Referring to FIG. 10, the terminal 1000 may include a receiver 1010, an ACK/NACK generator 1020, a controller 1030, an encoder 1040, and a transmitter 1050.

The receiver 1010 may receive, from a base station 1060, information associated with downlink CCs available from communication between the terminal 1000 and the base station 1060. Also, the receiver 1010 may receive a data block using a portion of or all of data receiving CCs among the downlink CCs.

The base station 1060 may assign, to the terminal 1000, a portion of data receiving CCs among the downlink CCs available by the base station 1060 and thereby, activate the assigned data receiving CCs. The base station 1060 may select a portion of the activated downlink CCs, and may transmit data using the selected downlink CC.

The receiver 1010 may receive downlink CC assignment information from the base station 1060. The ACK/NACK generator 1020 may detect a data block with respect to the downlink CC assigned to the terminal 1000.

With respect to a downlink CC unassigned to the terminal 1000, the ACK/NACK generator 1020 may generate DTX as ACK/NACK. Also, the ACK/NACK generator 1020 may determine that a downlink CC assigned to the terminal 1000, however, in which a PDCCH containing data scheduling information is not detected is not assigned to the terminal 1000.

Also, with respect to the downlink CC assigned to the terminal 1000, when the data block is successfully received, the ACK/NACK generator 1020 may generate ACK as the ACK/NACK. Conversely, when the data block is not successfully received, the ACK/NACK generator 1020 may generate NACK as the ACK/NACK.

Specifically, the ACK/NACK generator 1020 may generate ACK/NACK with respect to all of downlink CCs available at the base station 1060.

The ACK/NACK generator 1020 may determine a number of data blocks transmitted using each downlink CC based on a transmission mode of the base station 1060, and may generate ACK/NACK with respect to each of the data blocks.

The base station 1060 may transmit a data block according to a general data transmission scheme, for example, a non-MIMO transmission scheme, and may also transmit data using a MIMO transmission scheme.

When the base station 1060 is set to a MIMO transmission mode of transmitting data using the MIMO transmission scheme, the receiver 1010 may receive two data blocks using a single subframe included in a single data receiving CC.

When the base station 1060 is set to a non-MIMO transmission mode of transmitting data using the general data transmission scheme, for example, the non-MIMO transmission scheme, the receiver 1010 may receive a single data block using a single subframe included in a single data receiving CC.

Hereinafter, a procedure of generating, by a terminal, ACK/NACK will be described.

Configuration: A base station may notify each terminal of a downlink CC and an uplink CC to be used for communication between the base station and a corresponding terminal. The base station may notify each terminal of a transmission mode of each of configured CCs using an RRC message.

Activation: The base station may notify each terminal of a downlink CC and an uplink CC to be directly used for communication between the base station and a corresponding terminal. In this instance, a Media Access Control (MAC) message may be used. A downlink CC to be activated corresponds to a subset of downlink CCs configured as the configuration. The base station may perform downlink assignment only with respect to CCs belonging to an activated CC set of the terminal.

Setting of a PDCCH monitoring set: In the case of a terminal using a CIF, the base station may set the terminal to detect a PDCCH only with respect to a predetermined downlink CC. Downlink CCs for which the terminal is set to detect a predetermined PDCCH are referred to as the PDCCH monitoring set. The PDCCH monitoring set corresponds to a subset of activated downlink CCs.

The terminal may generate ACK/NACK as follows:

A terminal not using a CIF may detect a PDCCH search space in all of activated downlink CCs and thereby, verify whether a PDCCH is assigned to the terminal.

When a PDCCH monitoring set is set, a terminal using the CIF may detect the PDCCH search space with respect to only a corresponding downlink CC and thereby, verify whether the PDCCH is assigned to the terminal. Even in the case of the terminal using the CIF, when the PDCCH monitoring set is not set, the terminal may detect the PDCCH search space with respect to all of activated downlink CCs and thereby, verify whether any PDCCH is assigned to the terminal.

A set of activated CCs S_activation may be assumed to be configured as N CCs as follows:

S_activation={$CC_0, CC_1, \ldots, CC_{N-1}$}

Here, $CC_i$ needs to be an element of a set of configured CCs S_configuration, i.e., $CC_i \in$ S_configuration. Here, i=0, 1, ..., N-1.

1. Generating of ACK/NACK Based on a Set of Activated Downlink CCs:

The terminal may generate ACK/NACK based on the set of activated downlink CCs. Specifically, the terminal may configure ACK/NACK with respect to each CCi and then collect the configured ACK/NACK to thereby configure ACK/NACK with respect to N CCs of the activated downlink CCs. In general, downlink assignment information received at the terminal relates to all of activated downlink CCs or a subset thereof. However, ACK/NACK generated by the terminal may be with respect to all of activated downlink CCs. It may be assumed that the terminal has attempted PDCCH detection in a predetermined subframe and verified downlink assignment with respect to M CCs (M>0) as follows:

Set of downlink assigned CCs S_assignment={DA0, . . . DAM−1}

When predetermined CCi belongs to the set of downlink assigned CCs, i.e., when $CC_i \in$ S_assignment, ACK/NACK signal Signal_$CC_i$ with respect to CCi may be generated as follows:

When $CC_i \in$ S_assignment, when a single transport block is transmitted via $CC_i$, Signal_$CC_i$=ACK or NACK.

When two transport blocks are transmitted via $CC_i$, Signal_$CC_i$=ACK_ACK, ACK_NACK, NACK_ACK or NACK_NACK.

Here, ACK indicates that a corresponding transport block is successfully received and NACK indicates that the transport block is not successfully received. ACK_ACK, ACK_NACK, NACK_ACK, NACK_NACK, and the like may indicate whether a first transport block and a second transport block are successfully received or not.

When $CC_i \notin$ S_assignment, no assignment may be indicated in ACK/NACK signal Signal_CCi with respect to CCi as follows:

When $CC_i \notin$ S_assignment, Signal_CC_i=DTX.

Accordingly, ACK/NACK Signal with respect to downlink data with which the terminal is assigned in a predetermined subframe may be indicated as follows:

Signal={Signal_$CC_0$, . . . Signal_$CC_{N-1}$}

In this instance, when the terminal attempted the PDCCH detection in a predetermined subframe, however, no downlink assignment is detected, i.e., when M=0, the terminal may not transmit any ACK/NACK signal. Specifically, when Signal_$CC_i$=DTX with respect to i=0, 1, . . . N−1, the terminal may not transmit the ACK/NACK signal itself.

In the case of the above scheme, even with respect to a CC with which the terminal is not assigned in a predetermined single subframe, when the CC belongs to a set of activated CCs, no assignment DTX may be indicated in the ACK/NACK signal.

A method of transmitting, by the terminal, an ACK/NACK signal with respect to only an assigned CC may be considered. However, in this case, a confusion may occur between the terminal and the base station. Even though the base station attempts a downlink assignment by transmitting a PDCCH, the terminal may fail in receiving the PDCCH. When the terminal fails in receiving the PDCCH, whether the base station has transmitted the PDCCH may not be verified and thus, the base station may be regarded to not have transmitted the PDCCH. In this case, ACK/NACK transmitted from the terminal may be with respect to only a CC succeeding in receiving the PDCCH. Accordingly, the base station may not appropriately determine whether ACK/NACK transmitted from the terminal is generated as a result of successfully receiving all of PDCCHs transmitted from the base station, or by successfully receiving only a portion of the PDCCHs. Consequently, the base station may not appropriately verify ACK/NACK transmitted from the terminal.

In the case of using the aforementioned scheme, when it is assumed that the terminal and the base station have a mutually matched understanding with respect to a set of activated CCs, the terminal may generate ACK/NACK with respect to all of the activated CCs at all times. Accordingly, the base station may obtain ACK/NACK without any confusion.

A variety of schemes described in subclause 1.2 may be considered as a transmission scheme for a terminal to transmit ACK/NACK. When each of all cases indicated by ACK/NACK Signal={Signal_CC0, . . . Signal_CCN-1} is mapped to a different transmission form and thereby is transmitted, the base station may find ACK/NACK corresponding to the received transmission form.

For example, when a terminal set to not use a MIMO transmission scheme generates ACK/NACK with respect to two CCs, nine cases of ACK/NACK may be generated as shown in the following table. In the table, a last line corresponds to a case where the terminal detects no assignment with respect to all of two CCs. In this case, the terminal may not transmit any ACK/NACK signal. Accordingly, each of eight cases where the terminal transmits an ACK/NACK signal may be transmitted in a different transmission form and thereby, be identified by the base station.

In general, when the terminal indicates ACK/NACK with respect to N CCs, and when a number of cases of ACK/NACK that the terminal needs to express with respect to a single $CC_i$ is $L_i$, a total number of cases that the terminal needs to express through a signal transmission may become $L_0 \times L_1 \times \ldots \times L_{N-1} - 1$. Here, $-1$ is to exclude a case where the terminal does not receive any assignment with respect to all of N CCs. Accordingly, the base station and the terminal may need to promise in advance transmission forms that make a one-to-one correspondence with respect to $(L_0 \times L_1 \times \ldots \times L_{N-1} - 1)$ cases of ACK/NACK. In the case of a single transport block, cases of ACK, NACK, and DTX may exist and thus, $L_i=3$. In the case of two transport blocks, cases of ACK_ACK, ACK_NACK, NACK_ACK, NACK_NACK, and DTX may exist and thus, $L_i=5$.

According to the aforementioned ACK/NACK transmission scheme, cases of a channel selection, a resource selection, a sequence selection, and the like may need to make a one-to-one correspondence with respect to cases of ACK/NACK where each case of a selected channel, resource, sequence, and the like is different. When ACK/NACK is expressed using a bit like a DFT-S OFDM, the ACK/NACK may be expressed as $\log_2[L_1 \times \ldots \times L_{N-1}-1]$ bits. Table 39 shows a number of cases of ACK/NACK according to combinations of ACK/NACK values.

TABLE 39

|   | Signal_CC$_0$ | Signal_CC$_1$ |
| --- | --- | --- |
| 1 | ACK | ACK |
| 2 | ACK | NACK |
| 3 | ACK | DTX |
| 4 | NACK | ACK |
| 5 | NACK | NACK |
| 6 | NACK | DTX |
| 7 | DTX | ACK |
| 8 | DTX | NACK |
| 9 | DTX | DTX |

2. Generation of ACK/NACK Based on a Set of Downlink Configured CCs:

When there is a probability that a terminal and a base station may not have the mutually same understanding regarding the set of activated CCs, a method of generating information based on the set of downlink configured CCs may be used when the terminal generates ACK/NACK. Regarding a CC with assignment, this method may generate ACK/NACK using the same scheme as the aforementioned scheme of generating ACK/NACK based on the set of activated downlink CCs. Regarding a CC without assignment, when the CC belongs to a set of configured CCs, the terminal may indicate no assignment in an ACK/NACK signal.

A set of configured CC S_configuration may be assumed to be indicated as follows:

S_configuration={$CC_0, \ldots, CC_{K-1}$}

ACK/NACK Signal in response to downlink data in a subframe with which the terminal is assigned may be indicated as follows:

Signal={Signal_CC$_0$, . . . Signal_CC$_{K-1}$}

Here, Signal_CC$_i$ corresponds to ACK/NACK with respect to downlink CC $CC_i$.

The terminal may need to generate the ACK/NACK Signal based on a transmission mode of each of downlink CCs belonging to the set of configured CCs.

When a single transport block is transmitted via $CC_i$, Signal_CC$_i$=ACK or NACK.

When two transport blocks are transmitted via $CC_i$, Signal_CC$_i$=ACK_ACK, ACK_NACK, NACK_ACK or NACK_NACK.

When $CC_i \notin$ S_assignment, no assignment may be indicated in ACK/NACK signal Signal_CCi as follows:

When $CC_i \notin$ S_assignment, Signal_CC_i=DTX.

Here, when NACK and DTX are not discriminated from each other, NACK and DTX may be regarded as the same state. Accordingly, when the single transport block is transmitted via $CC_i$, Signal_CC$_i$=ACK or NACK/DTX.

When two transport blocks are transmitted via $CC_i$, Signal_CC$_i$=ACK_ACK, ACK_(NACK/DTX), (NACK/DTX)_ACK or (NACK/DTX)_(NACK/DTX).

In a DFT-S-OFDM based ACK/NACK transmission scheme, input bits of a channel encoder may be ACK/NACK bits. Hereinafter, a method of generating ACK/NACK bits will be described.

Method 1: Method of Generating ACK/NACK Based on a Transmission Mode for Each CC:

For example, it may be assumed that the terminal is set to have N downlink configured CCs, some of N downlink configured CCs are set to a MIMO transmission mode in which the terminal may transmit maximum two transport blocks and remaining CCs are set to a non-MIMO transmission mode in which the terminal may transmit a single transport block. In addition, it may be assumed that a NACK state and a DTX state are not discriminated from each other. Based on downlink assignment information received at the terminal, the number of transport blocks receivable at the terminal in a subframe may be zero, one, or two for each CC. A case where the number of transport blocks is zero corresponds to a case where the base station does not perform downlink assignment, or a case where the base station performs downlink assignment, however, the terminal does not appropriately receive the assignment information. Here, the terminal may generate ACK/NACK bits for all of the configured CCs at all times and may indicate ACK/NACK state based on the transmission modes of individual CCs. For example, in the case of a CC with which the number of assigned transport blocks is zero, if the CC is configured with a MIMO transmission mode, NACK/DTX may be indicated for each of two transport blocks using two bits. If the CC is configured with a non-MIMO transmission mode, NACK/DTX may be indicated using a single bit. Even if a single transport block is assigned to a corresponding subframe in a CC configured with the MIMO transmission mode, information may be indicated based on the maximum number of transport blocks receivable in the corresponding CC. Accordingly, ACK or NACK/DTX may need to be indicated using two bits with respect to each of two transport blocks.

Specifically, ACK/NACK bit values with respect to $CC_i$ may be indicated as in Table 40 or Table 41 based on the configured transmission mode. In the tables, DTX indicates that the terminal has not received downlink assignment information of a corresponding CC. Specifically, this may correspond to a case where the base station does not perform assignment with respect to the CC and thus, the terminal does not receive assignment information, or to a case where the base station transmits assignment information through a PDCCH, however, the terminal fails in receiving the assignment information. Regardless of whether the assignment information is received, the terminal needs to generate ACK/NACK bits with respect to all configured CCs. Accordingly, all of CCs belonging to configured CCs, however, of which assignment information is not received may be indicated as DTX. Table 40 shows generation of ACK/NACK bits of $CC_i$ set to the MIMO transmission mode. Table 41 shows generation of ACK/NACK bits of $CC_i$ configured with a non-MIMO transmission mode.

TABLE 40

[generation of ACK/NACK bits of $CC_i$ configured with a MIMO transmission mode]

| First transport block | Second transport block | $b_i(0), b_i(1)$ |
|---|---|---|
| ACK | ACK | 1, 1 |
| ACK | NACK | 1, 0 |
| NACK | ACK | 0, 1 |
| NACK | NACK | 0, 0 |
| DTX | | 0, 0 |

TABLE 41

[generation of ACK/NACK bits of $CC_i$ configured with a non-MIMO transmission mode]

| Transport block | $b_i(0)$ |
|---|---|
| ACK | 1 |
| NACK | 0 |
| DTX | 0 |

For example, when the terminal is configured to have five downlink configured CCs, and $CC_0$, $CC_1$, and $CC_2$ are set to be in a MIMO transmission mode, and $CC_3$ and $CC_4$ are set to be in a non-MIMO transmission mode, the ACK/NACK bits may include a total of (2+2+2+1+1=) 8 bits.

To maintain a consistent signal transmitting/receiving system matched between the terminal and the base station, the terminal may indicate an ACK/NACK state based on a transmission mode configured for each configured CC. Even though the base station transmits assignment information with respect to a downlink CC through a PDCCH, the terminal may not receive the assignment information. Accordingly, when the terminal transmits information with its magnitude varying depending on whether the assignment information is received, the base station may be unaware of whether the terminal has successfully received the assignment information and thus, it may be difficult to demodulate an ACK/NACK signal transmitted from the terminal and thereby obtain accurate information. For the above reason, the terminal may need to indicate an ACK/NACK state based on a set transmission mode at all times regardless of whether the assignment information is received.

If the ACK/NACK bit mapping method described in the aforementioned embodiment is used, the base station may not be able to discriminate NACK and DTX states. To enable the base station to identify whether the terminal has successfully received downlink grant PDCCH when the base station transmits a single transport block in a CC where the terminal is set to the MIMO transmission mode, a different ACK/NACK bit mapping may be used to indicate DTX. A CC set to a Single Input Multiple Output (SIMO) transmission mode may generate ACK/NACK as shown in Table 41, using a single bit. This is the same as the aforementioned case. The CC set to the MIMO transmission mode may indicate ACKJNACK using two bits, regardless of the number of actually received transport blocks. When the terminal receives a single transport block, ACK/NACK bits may be generated as shown in Table 45. When the terminal actually receives two transport blocks, ACK/NACK bits may be generated as shown in Table 46. When the terminal determines that a PDSCH transmission is absent in the CC set to the MIMO transmission mode, ACK/NACK bits may be generated as shown in Table 47. When such ACK/NACK bit mapping is used, the base station can identify all three states of ACK, NACK, and DTX when the base station transmits a single transport block. Specifically, the key point of ACK/NACK bit mapping lies in that in the case of a CC set to the MIMO transmission mode, ACK, NACK, and DTX are expressed using different bit values with respect to the single transport block. Because the base station knows whether the base station has transmitted a single transport block or two transport blocks, the base station is aware of which mapping should be applied between Table 45 and Table 46. Thus, in the case of transmission of a single-transport block, the base station can distinguish ACK, NACK, and DTX by referring to Table 45 and Table 47.

Method 2: Method of Generating ACK/NACK Based on a Maximum Transport Block Mode of Each CC:

The transmission mode of each CC configured for a terminal can be changed by RRC signaling. In this case, a matched understanding regarding the transmission mode may be absent between the terminal and the base station for a certain time interval. To solve the above problem, the terminal may need to indicate an ACK/NACK state based on a probable maximum transport block mode for each CC at all times. For example, it may be assumed that a terminal having a MIMO reception capability is configured to have five downlink CCs, and a portion of the five downlink CCs are set to a MIMO transmission mode capable of transmitting maximum two transport blocks and remaining downlink CCs are set to a non-MIMO transmission mode capable of transmitting a maximum single transport block. In addition, it may be assumed that NACK and DTX are not discriminated from each other. In this case, even with respect to a CC set to the non-MIMO transmission mode, the terminal may indicate an ACK/NACK state using two bits at all times. That is, even though the CC is set to the non-MIMO transmission mode, ACK/NACK may be generated using two bits as shown in Table 40. Through this, even in a time interval where a transmission mode varies by a reconfiguration of a transmission mode, a configuration of ACK/NACK between the terminal and the base station may not vary and thus, the base station may demodulate an ACK/NACK signal and thereby obtain accurate information.

Specifically, when the terminal has a MIMO reception capability, that is, when the terminal may receive maximum two transport blocks for each CC, ACK/NACK may be generated using two bits with respect to each of downlink CCs based on the above criterion. Accordingly, when a number of configured CCs is N, a total number of ACK/NACK bits generated by the terminal may become 2N. When the terminal does not have a MIMO reception capability and has only a SIMO reception capability, that is, when the terminal may receive a maximum single transport block, ACK/NACK may be generated using a single bit with respect to each of configured CCs based on the above criterion. Accordingly, when the number of configured CCs is N, a total number of ACK/NACK bits generated by the terminal may become N.

Hereinafter, methods of generating ACK/NACK bits will be described

1) A Case where the Terminal does not have a MIMO Reception Capability:

Since the terminal may receive only a maximum single transport block, a maximum transport block of each configured CC may be the same as one.

Method A: As shown in Table 42, ACK/NACK of a single transport block may be expressed using a single bit. In method A, an NACK state and a no-PDSCH transmission state may be mapped to the same bit value.

Method B: As shown in Table 43, ACK/NACK of a single transport block may be expressed using two bits. In method B, an NACK state and a no-PDSCH transmission state may be mapped to different bit values, so that the base station may discriminate the NACK state from the no-PDSCH transmission state.

TABLE 42

[indication of ACK/NACK bit value of $CC_i$ when a maximum single transport block is received in method A]

| Transport block state | $b_i(0)$ |
| --- | --- |
| ACK | 1 |
| NACK | 0 |
| No PDSCH transmission (DTX) | 0 |

TABLE 43

[indication of ACK/NACK bit value of $CC_i$ when a maximum single transport block is received in method B]

| Transport block state | $b_i(0)$, $b_i(1)$ |
| --- | --- |
| ACK | 1, 0 (or 1, 1) |
| NACK | 0, 1 |
| No PDSCH transmission (DTX) | 0, 0 |

2) A Case where the Terminal has a MIMO Reception Capability:

In this case, the terminal may receive maximum two transport blocks for each configured CC. As described above, ACK/NACK may be expressed using two bits for each CC regardless of a transmission mode of each CC. Table 44 shows an example of ACK/NACK indication in a CC set to the SIMO transmission mode capable of receiving a maximum single transport block.

TABLE 44

[example of ACK/NACK bit mapping of $CC_i$ set to SIMO transmission mode]

| Transport block state | $b_i(0)$, $b_i(1)$ |
| --- | --- |
| ACK | 1, 0 (or 1, 1) |
| NACK | 0, 1 |
| No PDSCH transmission (DTX) | 0, 0 |

TABLE 45

[example of ACK/NACK bit mapping of $CC_i$ set to MIMO transmission mode: case where terminal substantially receives a single transport block]

| Transport block state | $b_i(0)$, $b_i(1)$ |
| --- | --- |
| ACK | 1, 0 (or 1, 1) |
| NACK | 0, 1 |

TABLE 46

[example of ACK/NACK bit mapping of $CC_i$ set to MIMO transmission mode: case where terminal substantially receives two transport blocks]

| First transport block state | Second transport block state | $b_i(0)$, $b_i(1)$ |
| --- | --- | --- |
| ACK | ACK | 1, 1 |
| ACK | NACK | 1, 0 |
| NACK | ACK | 0, 1 |
| NACK | NACK | 0, 0 |

Table 47 shows an ACK/NACK bit value when the terminal determines that a PDSCH transmission is absent in a CC set to the MIMO transmission mode.

TABLE 47

[example of ACK/NACK bit value mapping of $CC_i$ set to MIMO transmission mode: case where terminal determines that downlink PDSCH transmission is absent by including SPS PDSCH transmission]

| | $b_i(0)$, $b_i(1)$ |
| --- | --- |
| No PDSCH transmission (DTX) | 0, 0 |

What is important in the above scheme, both a case where the terminal determines that a PDSCH transmission is absent with respect to CC; and a case where the terminal receives two transport blocks, however, detects NACK with respect to all of the transport blocks may need to be expressed using the same bit value. In the above example, $(b_i(0), b_i(1))=(0, 0)$. The above bit value mapping corresponds to one embodiment. Another type of bit mapping may be employed. However, it may be desirable to express, using the same bit value, both the case where the terminal determines that the PDSCH assignment is absent with respect to $CC_i$ and the case where the terminal receives two transport blocks, however, detects NACK with respect to all of the transport blocks. This is to enable the base station to be aware of a circumstance that the base station has transmitted a single transport block via a downlink grant so that the terminal may receive the single transport block, however, the terminal has not successfully received the downlink grant. The base station may effectively control a power of a PDCCH using the above information.

However, when resetting of a transmission mode barely occurs, or when resetting of the transmission mode is constrained, the terminal may employ a scheme of indicating an ACK/NACK state based on a transmission mode set for each CC at all times as shown in method 1.

In the above two schemes, when the terminal receives a downlink assignment with respect to only a single downlink CC and the assigned CC corresponds to a downlink PCC, the terminal may be assigned with an ACK/NACK resource and may perform transmission using the same scheme as LTE Rel-8/9.

Method 3: Method of Generating ACK/NACK Based on a DCI Format for Downlink Assignment Transmitted for Each CC:

Method 3 corresponds to a method of indicating ACK/NACK generated by the terminal depending on whether a DCI format transmitted to the terminal corresponds to a format for a MIMO transmission or a format for a SIMO transmission. In LTE Rel-8/9, even though the terminal has a MIMO transmission mode, the base station may transmit a DCI format for a SIMO transmission by including a fall-back mode. In LTE Rel-8/9, the DCI format for the SIMO transmission for fall-back corresponds to DCI format 1A. Table 48 shows TS36.213 v9.10, Table 7.1-5.

standard may employ the DCI format for the SIMO transmission for fall-back, which is similar to LTE Rel-8/9.

In this method, the terminal may determine a number of ACK/NACK bits depending on whether the received DCI format corresponds to a format for the MIMO in transmission or a format for the SIMO transmission. When the DCI format successfully received at the terminal corresponds to the DCI format for the MIMO transmission, two bits may be used. When the received DCI format corresponds to the DCI format for the SIMO transmission, a single bit may be used.

In the case of the above method, when the terminal does not successfully receive the DCI format transmitted from the base station, the terminal may not determine the number of ACK/NACK bits. For example, when the terminal does not receive downlink assignment information with respect to a predetermined CC, the terminal may not determine whether to express ACK/NACK using a single bit or two bits even though the terminal needs to generate the ACK/NACK indicating DTX/NACK.

When the terminal transmits ACK/NACK in a subframe where a scheduling request resource is assigned, the terminal

TABLE 48

[PDCCH and PDSCH configured by C-RNTI]

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4)or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port; port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission; port 7 and 8 (see subclause 7.1.5A) or single-antenna port; port 7 or 8 (see subclause 7.1.1) |

In Table 48, mode 3, mode 4, and mode 8 correspond to a MIMO mode capable of transmitting maximum two transport blocks. The MIMO mode may be assigned with a downlink resource through DCI format 1A that is the DCI format for the SIMO transmission, in addition to the DCI format for the MIMO transmission. Even an LTE-Advance may perform encoding by adding, to a number of ACK/NACK bits, a single bit indicating whether of a scheduling request. Specifically, when ACK/NACK includes N bits, the terminal may add a single bit of scheduling request information and thereby, use a total of (N+1) bits as an input. Next, after performing RM coding, the terminal may transmit the RM coding result according to a DFT-S-OFDM based ACK/NACK transmission scheme.

When the terminal receives a downlink assignment with respect to only a single downlink CC in a predetermined subframe, and the assigned downlink CC corresponds to a downlink PCC, the terminal may be assigned with an ACK/NACK resource and transmit ACK/NACK using the same transmission scheme as LTE Rel-8/9. When a PDSCH assignment using a dynamic PDCCH is absent in a PCC, however, when an SPS assignment is present in the PCC, the terminal may use a persistent ACK/NACK resource corresponding to the SPS assignment and may transmit ACK/NACK using the same resource assignment and transmission format as LTE Rel-8/9.

In the subframe where the scheduling request resource is assigned, in the case of negative SR, the terminal may transmit ACK/NACK according to Rel-8/9 fallback scheme of DFT-S-OFDM ACK/NACK as above. In the case of positive SR, the terminal may transmit corresponding ACK/NACK using the assigned scheduling request resource. Specifically, the terminal may use the same scheme described in the single-carrier Rel-8/9 standard which is applied when the terminal transmits ACK/NACK and positive SR in the same subframe.

According to an aspect, the controller 1030 may determine whether a scheduling request resource is assigned to the terminal 1000 in a predetermined subframe. When the scheduling request resource is assigned, the encoder 1040 may encode a scheduling request.

The encoder 1040 may encode the scheduling request and ACK/NACK with respect to a data block. The transmitter 1050 may transmit, to the base station 1060, the encoded scheduling request and ACK/NACK.

According to an aspect, when a transmit power is insufficient due to a relatively poor channel environment, for example, a cell edge and the like, ACK/NACK bundling may be applied. A base station may set ACK/NACK bundling in a terminal using RRC signaling. The terminal set to the ACK/NACK bundling may transmit an ACK/NACK signal by performing ACK/NACK bundling.

The base station may assign a radio resource for ACK/NACK bundling using RRC signaling. The base station may assign, as the radio resource for ACK/NACK bundling, one of radio resources belonging to an uplink PCC.

The base station may also assign a radio resource to the terminal using an index of a channel element.

Cross-carrier scheduling may not be set with respect to the terminal. In this case, the base station may assign the radio resource using a lowest channel element index in control information assigned to a PCC.

Also, when SPS is assigned, the base station may transmit an ACK/NACK bundling signal using a persistent radio resource corresponding to the SPS assignment.

Cross-carrier scheduling may be set with respect to the terminal. In this case, the base station may assign the radio resource using the lowest channel element index in control information assigned to the PCC. Also, the base station may assign the radio resource using a highest channel element index in control information received using another CC.

The terminal may transmit, to the base station, a number of downlink CCs of which a PDSCH is successfully received in a subframe where downlink assignment information is transmitted. The base station may determine a transmission using which CC is successfully performed based on the number of downlink CCs of which the PDSCH is successfully received.

When two data blocks are assigned within an assigned uplink CC, the terminal may perform ACK/NACK bundling. When two data blocks are received, ACK/NACK bundling may obtain ACK/NACK bits with respect to each data block through a logic operation 'AND'.

Figure 11:
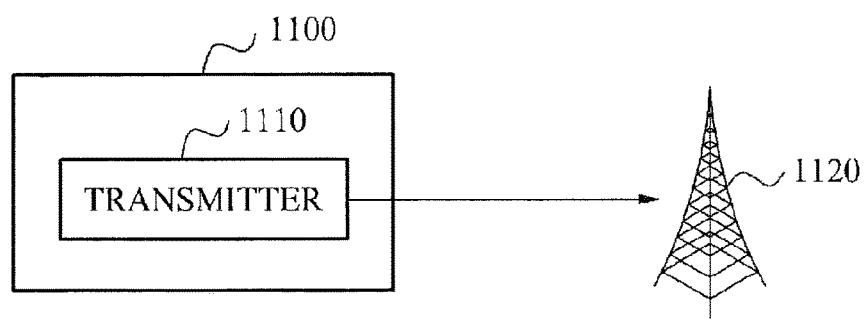
FIG. 11 a block diagram illustrating a configuration of a terminal according to yet another embodiment of the present invention.

FIG. 11 is a block diagram illustrating a configuration of a terminal 1100 according to yet another embodiment of the present invention.

The terminal 1100 may include a transmitter 1110.

The transmitter 1110 may transmit, to a base station 1120, a subframe including a first slot and a second slot. Each of the first slot and the second slot may include a cyclic shift.

According to an aspect, a first cyclic shift included in the first slot may be different from a second click shift included in the second slot. In this case, interference between terminals transmitting control information to a base station may be randomized.

The transmitter 1110 may change a first cyclic shift for each subframe. When the first cyclic shift is changed, a second cyclic shift may also be changed to be different from the first cyclic shift.

According to an aspect, a base station may receive data from a plurality of terminals. In this case, interference may occur between the data received from the plurality of terminals. For example, when a first terminal transmits a first slot and a second slot, and a second terminal transmits a third slot and a fourth slot, the first slot may interfere with the third slot transmitted in the same time zone. The second slot may interfere with the fourth slot transmitted in the same time zone.

Based on interference between the first cyclic shift included in the first slot and the third cyclic shift included in the third slot, the second cyclic shift included in the second slot and the fourth cyclic shift included in the fourth slot may be determined.

For example, when a DFT sequence is used as a cyclic shift, the orthogonality may be further maintained as sequence indices is further separate from each other. Accordingly, when two terminals use neighboring sequences as a cyclic shift in the first slot, the terminals may determine separate sequences as a cyclic shift in the second slot. According to the above embodiment, most interfering terminals may be appropriately distributed in the first slot and the second slot, whereby an amount of interference may be normalized.

The base station may transmit a single transport block using a plurality of downlink CCs. In this case, it is possible to guarantee a relatively excellent data rate even for a terminal with a relatively poor channel environment, for example, a cell edge and the like.

According to an aspect, a base station may repeat the same transmission with respect to a plurality of downlink CCs. That is, the base station may transmit the same transport block using the exactly same amount of resources and a transmission format, for example, a Modulation and Coding Scheme (MCS) and the like. This may be referred to as a 'frequency domain loop transmission of downlink CC level'.

When the terminal combines the received data using a plurality of downlink CCs, a receive power and a diversity may increase whereby a reception quality may be enhanced. The terminal may demodulate and decode a transport block generated by combining the data, and may perform a CRC, and then may transmit a corresponding result using a single ACK/NACK symbol.

Data transmitted using each CC may form a single codeword. That is, data transmitted using a single CC may be self-decodable. This is to decrease a complexity between the terminal and the base station by mapping a single codeword to a single CC at all times in all the cases of including the aforementioned 'frequency domain loop transmission of downlink CC level'.

According to another aspect, a different form of a codeword with respect to the same transport block may be allowable to different CCs. For example, a transmission scheme used for retransmission in a time domain may be used for a different CC of a frequency domain. This method is to allow all the transmission formats used for HARQ retransmission to be available for loop transmission of the CC level.

The above loop transmission of the CC level through the same codeword transmission may be a special example of the above method.

The terminal may receive a downlink grant in the same form as a downlink grant using a CIF or a downlink grant not using the CIF. ACK/NACK with respect to a received transport block is a single symbol and thus, the terminal may transmit the ACK/NACK using a single uplink CC. In this instance, the terminal may select a resource corresponding to a predetermined PDCCH from resources defined in LTE Rel-8 and thereby, transmit the ACK/NACK using the selected resource.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A communication method performed by a User Equipment (UE), the method comprising:
   acquiring information about one or more serving cells configured for the UE;
   receiving data using the one or more serving cells configured for the UE, wherein each of the one or more serving cells configured for the UE supports one of a plurality of transmission modes and each of the plurality of transmission modes supports one or two transport blocks;
   generating acknowledgement/negative-acknowledgement (ACK/NAK) information for the data for each of the one or more serving cells configured for the UE; and
   transmitting the ACK/NAK information for each of the one or more serving cells configured for the UE,
   wherein the ACK/NAK information for each of the one or more serving cells configured for the UE consists of a number of bits, the number of bits being determined based on the transmission mode supported by the serving cell.

2. The method of claim 1, wherein a number of bits of the ACK/NAK information for a serving cell configured for the UE is one (1) in case the transmission mode for the serving cell configured for the UE supports one (1) transport block.

3. The method of claim 1, wherein a number of bits of the ACK/NAK information for a serving cell configured for the UE is two (2) in case the transmission mode for the serving cell configured for the UE supports two (2) transport blocks.

4. The method of claim 3, wherein in case only one (1) transport block is correctly received among two (2) transport blocks transmitted to the UE for the serving cell configured for the UE, the UE generates a negative-acknowledgement (NAK) bit for the other transport block.

5. The method of claim 1, wherein a total number of bits of the ACK/NAK information for the data for the one or more serving cells configured for the UE is determined based on a sum of the numbers of bits of the ACK/NAK information for each of the one or more serving cells configured for the UE.

6. The method of claim 1, wherein the UE transmits two (2) NAK bits as the ACK/NAK information for a serving cell configured for the UE in case the serving cell supports a transmission mode which supports two transport blocks even when the UE has not received any data from the serving cell.

7. The method of claim 1, wherein the one or more serving cells configured for the UE comprise a first serving cell configured with a transmission mode that supports two transport blocks, and the number of bits of the ACK/NAK information for the first serving cell is two.

8. The method of claim 1, wherein:
   the one or more serving cells configured for the UE comprise a first serving cell configured with a transmission mode that supports two transport blocks,
   the data received using the first serving cell consists of one transport block, and
   the number of bits of the ACK/NAK information for the first serving cell is two.

9. A User Equipment (UE), comprising,
   a memory; and
   a processor operably coupled to the memory,
   wherein the processor, when executing program instructions stored in the memory, is configured to:
      cause the UE to acquire information about one or more serving cells configured for the UE;
      cause the UE to receive data using the one or more serving cells configured for the UE, wherein each of the one or more serving cells configured for the UE supports one of a plurality of transmission modes and each of the plurality of transmission modes supports one or two transport blocks;
      cause the UE to generate acknowledgement/negative-acknowledgement (ACK/NAK) information for the data for each of the one or more serving cells configured for the UE; and
      cause the UE to transmit the ACK/NAK information for each of the one or more serving cells configured for the UE,
   wherein the ACK/NAK information for each of the one or more serving cells configured for the UE consists of a number of bits, the number of bits being determined based on the transmission mode supported by the serving cell.

10. The UE of claim 9, wherein a number of bits of the ACK/NAK information for a serving cell configured for the UE is two (2) in case the transmission mode for the serving cell configured for the UE supports two (2) transport blocks.

11. The UE of claim 9, wherein in case only one (1) transport block is correctly received among two (2) transport blocks transmitted to the UE for the serving cell configured for the UE, the UE generates a negative-acknowledgement (NAK) bit for the other transport block.

12. The UE of claim 9, wherein a total number of bits of the ACK/NAK information for the data for the one or more serving cells configured for the UE is determined based on a sum of the numbers of bits of the ACK/NAK information for each of the one or more serving cells configured for the UE.

13. The UE of claim 9, wherein the UE transmits two (2) NAK bits as the ACK/NAK information for a serving cell configured for the UE in case the serving cell supports a transmission mode which supports two transport blocks even when the UE has not received any data from the serving cell.

14. The UE of claim 9, wherein the one or more serving cells configured for the UE comprise a first serving cell configured with a transmission mode that supports up to two transport blocks, and the number of bits of the ACK/NAK information for the first serving cell is two.

15. The UE of claim 9, wherein:
the one or more serving cells configured for the UE comprise a first serving cell configured with a transmission mode that supports two transport blocks,
the data received using the first serving cell consists of one transport block, and
the number of bits of the ACK/NAK information for the first serving cell is two.

16. A communication apparatus, comprising:
a memory; and
a processor operably coupled to the memory,
wherein the processor, when executing program instructions stored in the memory, is configured to:
cause the communication apparatus to acquire information about one or more serving cells configured for the UE;
cause the communication apparatus to transmit data using the one or more serving cells configured for the UE, wherein each of the one or more serving cells configured for the UE supports one of a plurality of transmission modes and each of the plurality of transmission modes supports one or two transport blocks; and
cause the communication apparatus to receive acknowledgement/negative-acknowledgement (ACK/NAK) information for the data for each of the one or more serving cells configured for the UE,
wherein the ACK/NAK information for each of the one or more serving cells configured for the UE consists of a number of bits, the number of bits being determined based on the transmission mode supported by the serving cell.

17. The communication apparatus of claim 16, wherein a number of bits of the ACK/NAK information for a serving cell configured for the UE is one (1) in case the transmission mode for the serving cell configured for the UE supports one (1) transport blocks.

18. The communication apparatus of claim 16, wherein a number of bits of the ACK/NAK information for a serving cell configured for the UE is two (2) in case the transmission mode for the serving cell configured for the UE supports two (2) transport blocks.

19. The communication apparatus of claim 18, wherein in case only one (1) transport block is correctly received among two (2) transport blocks transmitted to the UE for the serving cell configured for the UE, the UE transmits a negative-acknowledgement (NAK) bit for the other transport block.

20. The communication apparatus of claim 16, wherein a total number of bits of the ACK/NAK information for the data for the one or more serving cells configured for the UE is determined based on a sum of the numbers of bits of the ACK/NAK information for each of the one or more serving cells configured for the UE.

21. The communication apparatus of claim 16, wherein the communication apparatus receives two (2) NAK bits as the ACK/NAK information for a serving cell configured for the UE in case the serving cell supports a transmission mode which supports two transport blocks even when the serving cell has not transmitted any data to the UE.

22. The communication apparatus of claim 16, wherein the one or more serving cells configured for the UE comprise a first serving cell configured with a transmission mode that supports two transport blocks, and the number of bits of the ACK/NAK information for the first serving cell is two.

23. The communication apparatus of claim 16, wherein:
the one or more serving cells configured for the UE comprise a first serving cell configured with a transmission mode that supports two transport blocks,
the data received using the first serving cell consists of one transport block, and
the number of bits of the ACK/NAK information for the first serving cell is two.

24. A communication method, comprising:
acquiring information about one or more serving cells configured for a User Equipment (UE);
transmitting data using the one or more serving cells configured for the UE, wherein each of the one or more serving cells configured for the UE supports one of a plurality of transmission modes and each of the plurality of transmission modes supports one or two transport blocks; and
receiving acknowledgement/negative-acknowledgement (ACK/NAK) information for the data for each of the one or more serving cells configured for the UE,
wherein the ACK/NAK information for each of the one or more serving cells configured for the UE consists of a number of bits, the number of bits being determined based on the transmission mode supported by the serving cell.

25. The method of claim 24, wherein a number of bits of the ACK/NAK information for a serving cell configured for the UE is one (1) in case the transmission mode for the serving cell configured for the UE supports one (1) transport blocks.

26. The method of claim 24, wherein a number of bits of the ACK/NAK information for a serving cell configured for the UE is two (2) in case the transmission mode for the serving cell configured for the UE supports two (2) transport blocks.

27. The method of claim 26, wherein in case only one (1) transport block is correctly received among two (2) transport blocks transmitted to the UE for the serving cell configured for the UE, the UE transmits a negative-acknowledgement (NAK) bit for the other transport block.

28. The method of claim 24, wherein a total number of bits of the ACK/NAK information for the data for one or more serving cells configured for the UE is determined based on a sum of the numbers of bits of the ACK/NAK information for each of the one or more serving cells configured for the UE.

29. The method of claim 24, wherein the one or more serving cells configured for the UE comprise a first serving cell configured with a transmission mode that supports two transport blocks, and the number of bits of the ACK/NAK information for the first serving cell is two.

30. The method of claim 24, wherein:
the one or more serving cells configured for the UE comprise a first serving cell configured with a transmission mode that supports two transport blocks,
the data received using the first serving cell consists of one transport block, and
the number of bits of the ACK/NAK information for the first serving cell is two.

31. A communication device for a User Equipment (UE), comprising:
  a memory; and
  a processor operably coupled to the memory,
  wherein the processor, when executing program instructions stored in the memory, is configured to:
    cause the UE to acquire information about one or more serving cells configured for the UE;
    cause the UE to receive data using the one or more serving cells configured for the UE, wherein each of the one or more serving cells configured for the UE supports one of a plurality of transmission modes and each of the plurality of transmission modes supports one or two transport blocks;
    cause the UE to generate acknowledgement/negative-acknowledgement (ACK/NAK) information for the data for each of the one or more serving cells configured for the UE; and
    cause the UE to transmit the ACK/NAK information for each of the one or more serving cells configured for the UE,
  wherein the ACK/NAK information for each of the one or more serving cells configured for the UE consists of a number of bits, the number of bits being determined based on a the transmission mode supported by the serving cell.

32. The device of claim 31, wherein a number of bits of the ACK/NAK information for a serving cell configured for the UE is two (2) in case the transmission mode for the serving cell configured for the UE supports two (2) transport blocks.

33. The device of claim 31, wherein in case only one (1) transport block is correctly received among two (2) transport blocks transmitted to the UE for the serving cell configured for the UE, the UE generates a negative-acknowledgement (NAK) bit for the other transport block.

34. The device of claim 31, wherein a total number of bits of the ACK/NAK information for the data for the one or more serving cells configured for the UE is determined based on a sum of the numbers of bits of the ACK/NAK information for each of the one or more serving cells configured for the UE.

35. The device of claim 31, wherein the UE transmits two (2) NAK bits as the ACK/NAK information for a serving cell configured for the UE in case the serving cell supports a transmission mode which supports two transport blocks even when the UE has not received any data from the serving cell.

36. The device of claim 31, wherein the one or more serving cells configured for the UE comprise a first serving cell configured with a transmission mode that supports two transport blocks, and the number of bits of the ACK/NAK information for the first serving cell is two.

37. The device of claim 31, wherein:
  the one or more serving cells configured for the UE comprise a first serving cell configured with a transmission mode that supports two transport blocks,
  the data received using the first serving cell consists of one transport block, and
  the number of bits of the ACK/NAK information for the first serving cell is two.

* * * * *